(12) United States Patent
Hatakeyama

(10) Patent No.: US 6,819,722 B2
(45) Date of Patent: Nov. 16, 2004

(54) OFFSET CONTROL CIRCUIT, OPTICAL RECEIVER USING THE SAME AND OPTICAL COMMUNICATION SYSTEM

(75) Inventor: Ichiro Hatakeyama, Tokyo (JP)

(73) Assignee: NEC Corporation (JP)

( * ) Notice: Subject to any disclaimer, the term of this patent is extended or adjusted under 35 U.S.C. 154(b) by 724 days.

(21) Appl. No.: 09/732,564

(22) Filed: Dec. 8, 2000

(65) Prior Publication Data

US 2001/0004388 A1 Jun. 21, 2001

(30) Foreign Application Priority Data

Dec. 15, 1999 (JP) .......................................... 11-355381

(51) Int. Cl.[7] .......................... H04L 25/66; H04L 25/10
(52) U.S. Cl. ...................................... 375/318; 455/359
(58) Field of Search .......................... 375/318; 359/189; 250/214; 330/59, 308

(56) References Cited

U.S. PATENT DOCUMENTS

| 5,025,456 | A | | 6/1991 | Ota et al. ...................... 375/76 |
| 5,498,993 | A | * | 3/1996 | Ohtsuka et al. ............. 327/514 |
| 5,612,810 | A | * | 3/1997 | Inami et al. ................. 398/202 |
| 5,777,507 | A | * | 7/1998 | Kaminishi et al. .......... 327/514 |
| 5,892,609 | A | * | 4/1999 | Saruwatari ................... 398/202 |
| 6,181,454 | B1 | * | 1/2001 | Nagahori et al. ........... 398/210 |
| 6,451,150 | B2 | * | 9/2002 | Feldman et al. ............ 398/209 |
| 6,595,708 | B1 | * | 7/2003 | Yamashita ................... 398/202 |

FOREIGN PATENT DOCUMENTS

| JP | 58-53271 | 3/1983 |
| JP | 6-232917 | 8/1994 |
| JP | 7-15343 | 1/1995 |
| JP | 7-142935 | 6/1995 |
| JP | 8-84160 | 3/1996 |
| JP | 8-084160 | 3/1996 |
| JP | 8-293838 | 11/1996 |
| JP | 10-84231 | 3/1998 |
| JP | 10-261940 | 9/1998 |
| JP | 11-205395 | 7/1999 |

* cited by examiner

*Primary Examiner*—Stephen Chin
*Assistant Examiner*—Harry Vartanian
(74) *Attorney, Agent, or Firm*—Dickstein, Shapiro, Morin & Oshinsky, LLP.

(57) ABSTRACT

An offset control circuit can obtain an output waveform free of fluctuation of duty ratio by canceling offset transitionally varying according to elapsed time even upon reception of an optical signal in burst form significantly variable of level difference, an optical receiver employing the same and an optical communication system. The offset control circuit has offset canceling means for canceling an offset component included in a pair of positive-phase and negative-phase signal and varying transitionally according to elapse of time by using at least one of a peak value and a bottom value of the positive-phase and negative-phase signal.

26 Claims, 22 Drawing Sheets

FIG. 2
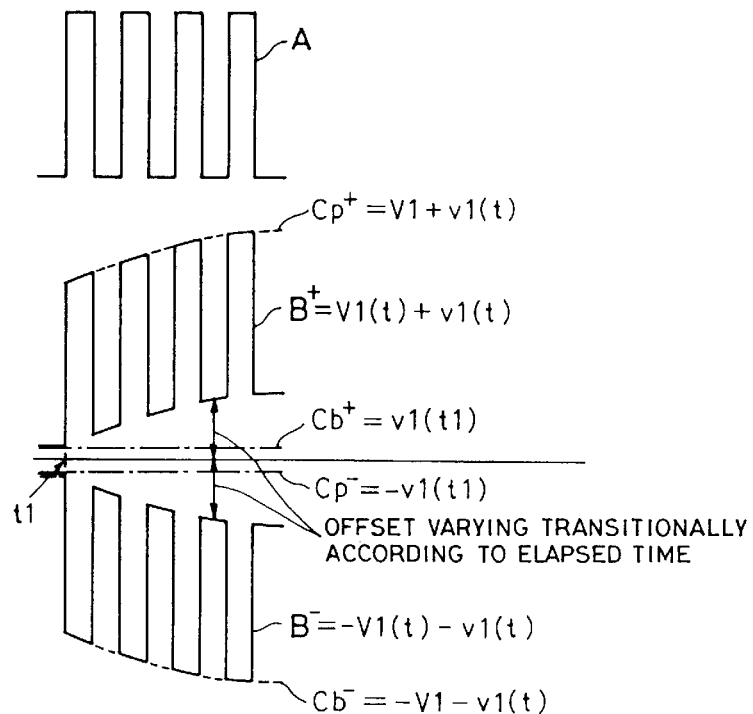
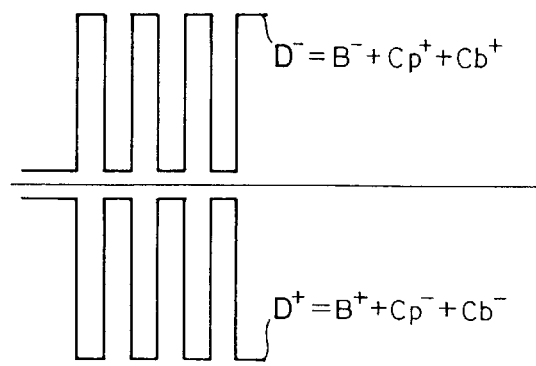
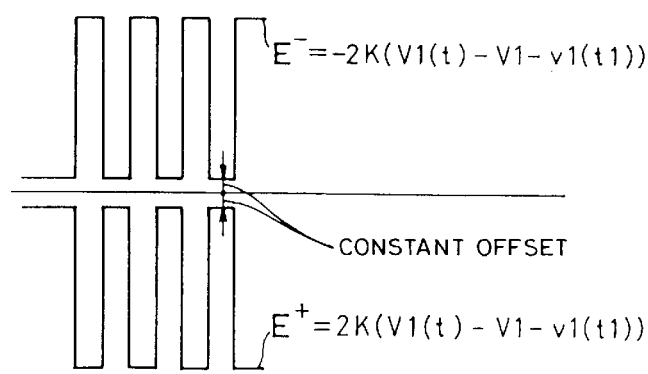

FIG. 4
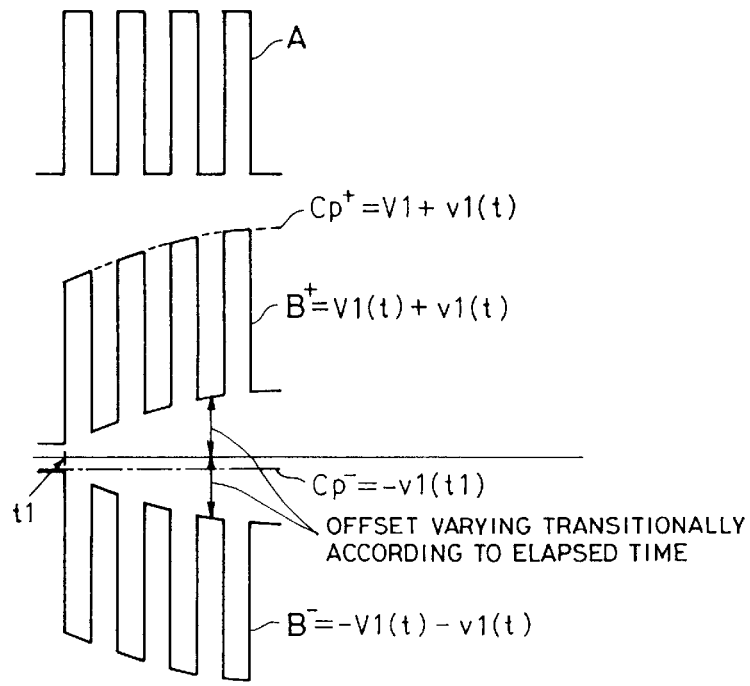
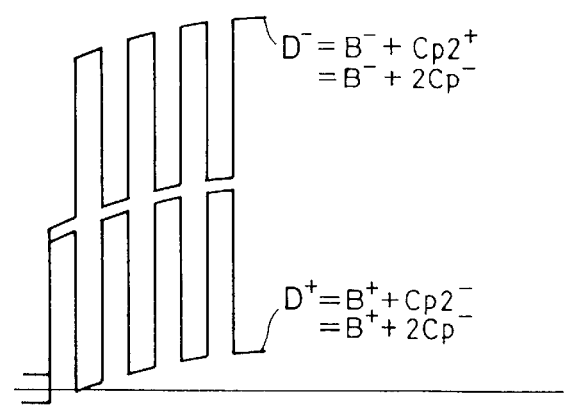
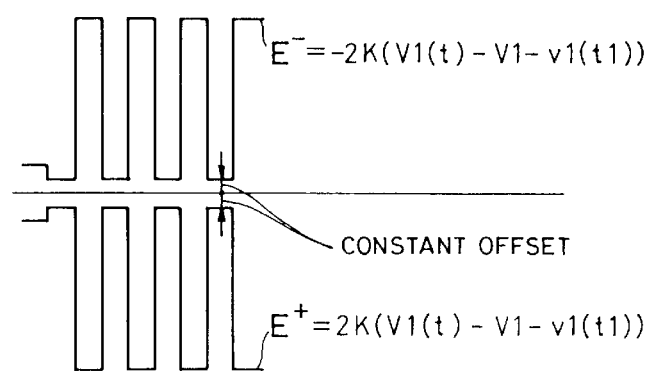

FIG. 8
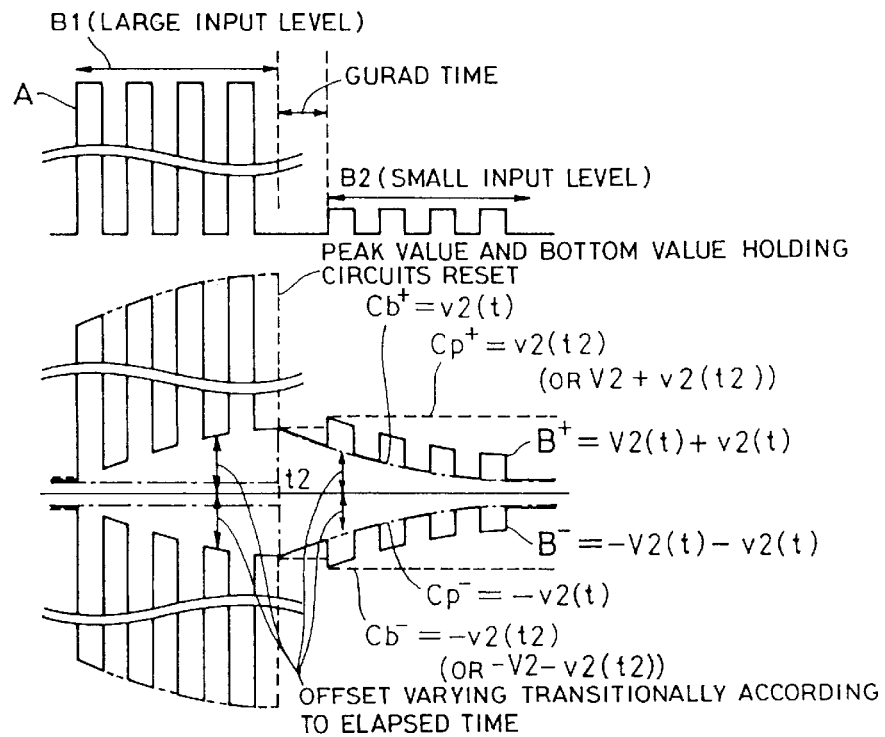
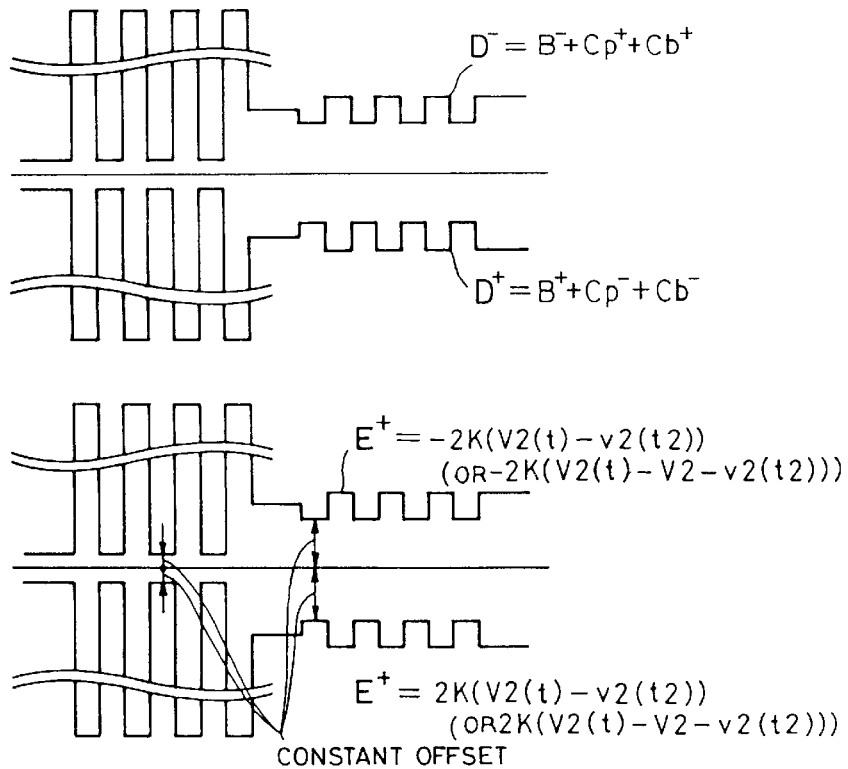

FIG.10
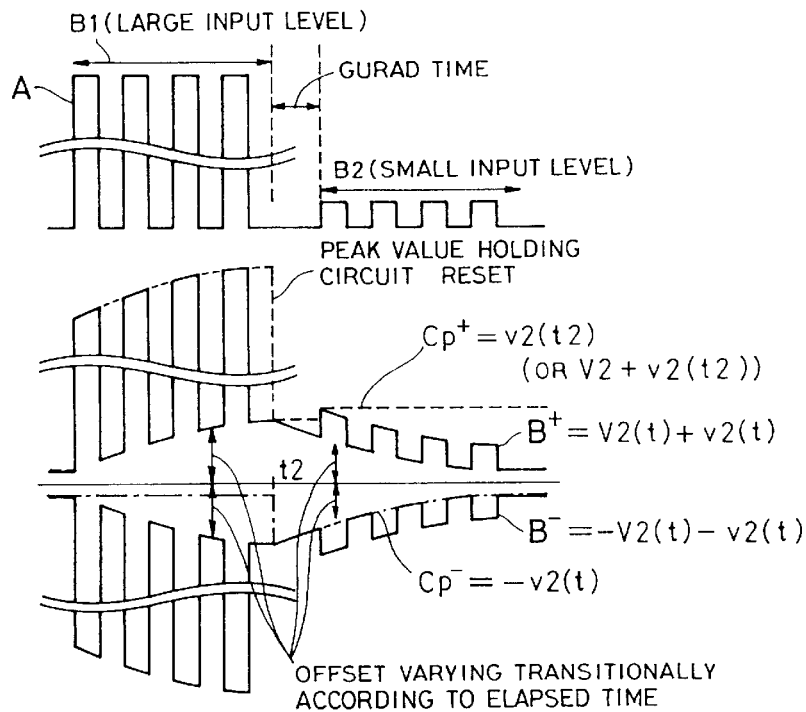
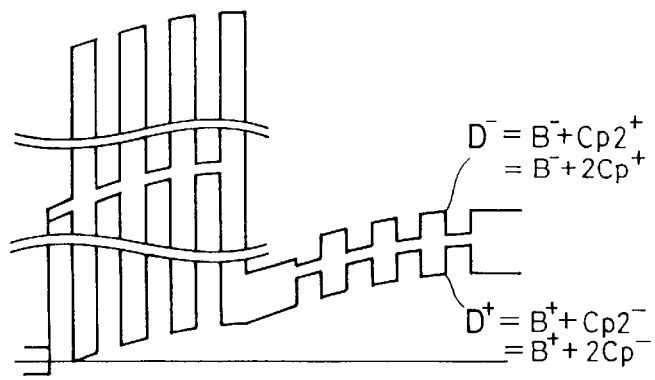
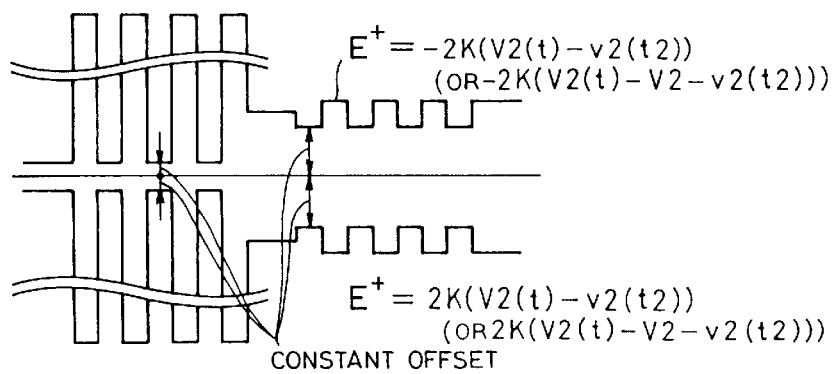

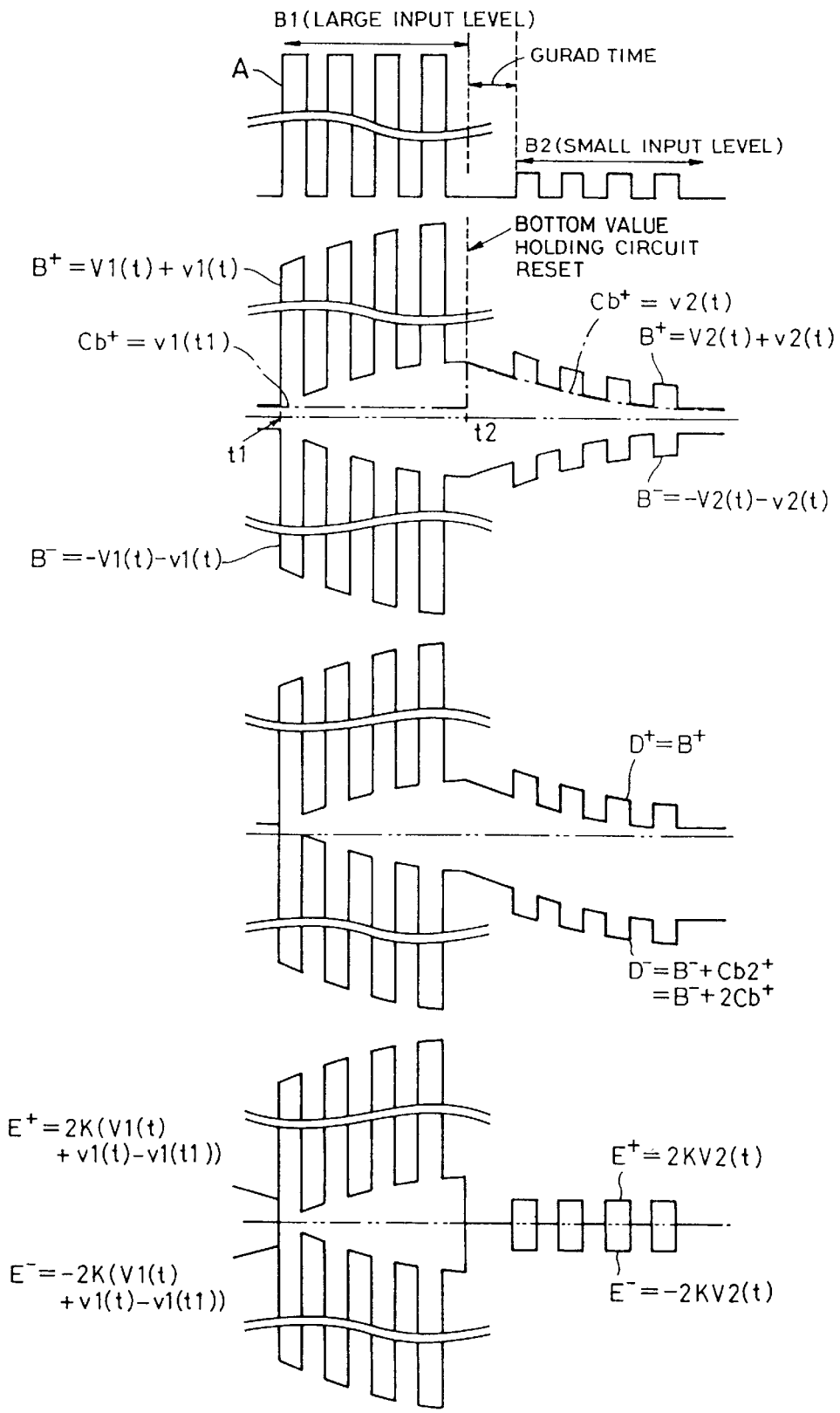

FIG.19
PRIOR ART

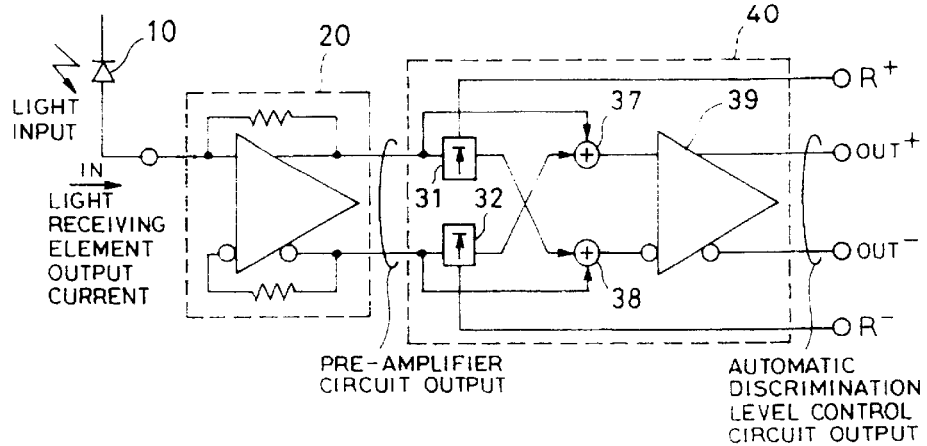

WHEN CONSTANT LEVEL
OFFSET PRESENTS

WHEN OFFSET VARYING
TRANSITIONALLY ACCORDING
TO ELAPSED TIME PRESENTS

INPUT LIGHT WAVEFORM

INPUT LIGHT WAVEFORM

LIGHT RECEIVING ELEMENT
OUTPUT CURRENT

LIGHT RECEIVING ELEMENT
OUTPUT CURRENT

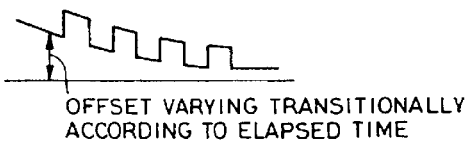

CONSTANT LEVEL
OFFSET

OFFSET VARYING TRANSITIONALLY
ACCORDING TO ELAPSED TIME

PRE-AMPLIFIER CIRCUIT
OUTPUT

PRE-AMPLIFIER CIRCUIT OUTPUT

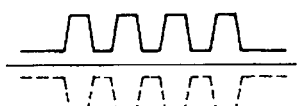

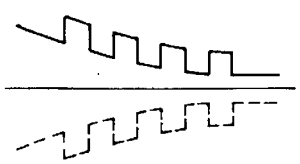

AUTOMATIC DISCRIMINATION
LEVEL CONTROL CIRCUIT
OUTPUT

AUTOMATIC DISCRIMINATION
LEVEL CONTROL CIRCUIT
OUTPUT

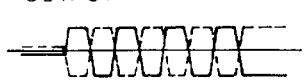

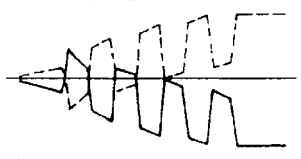

DUTY RATIO DEGRADATION / CODE
ERROR INCREASE

OFFSET CONTROL CIRCUIT, OPTICAL RECEIVER USING THE SAME AND OPTICAL COMMUNICATION SYSTEM

BACKGROUND OF THE INVENTION

1. Field of the Invention

The present invention relates to an offset control circuit, an optical receiver using the same and an optical communication system. More particularly, the invention relates to an offset control circuit controlling transitionally varying offset level according to an elapsed time when a wide dynamic level is required in an optical receiver for receiving a burst signal, the optical receiver and an optical communication system.

2. Description of the Related Art

In general, an optical receiver employing an optical access system, an optical LAN, an optical interconnection and so forth, is constructed with a light receiving element receiving a digital light signal and converting into a current signal and a reception circuit amplifying the current signal and converting into a digital electric signal having a given amplitude. For an input current signal of the reception circuit in the optical receiver of this kind, a given level of an offset current is generated due to influence of an extinction ratio failure, reflected return light and a dark current generated in a light receiving element of a receiver, and so forth. At the same time, among carriers generated in response to incidence of light, a carrier generated in a portion in the light receiving element where field intensity is low, spreads gradually in a long period to cause offset current varying large time constant in comparison with a clock frequency of the signal.

If the current signal having offset is amplified, a duty ratio of an output waveform is significantly fluctuates to cause difficulty in accurate discrimination of logical "0" level and logical "1" level. Among the problems of fluctuation of the duty ratio due to offset current, the various prior arts suppressing fluctuation of duty ratio due to a given level of offset current have been proposed. For example, as shown in FIG. 19, an optical receiver circuit disclosed in Japanese Unexamined Patent Publication No. Heisei 8-84160 (corresponding to U.S. Pat. No. 5,612,810) proposes cancellation of a given level of offset respectively adding peak values of a positive-phase output and a negative-phase output of a differential pre-amplifier 20 and peak values of the negative-phase output and the positive-phase output, and can restrict fluctuation of duty ratio by setting a half value of a signal pulse amplitude as a threshold value for discriminating logical "0" level and logical "1" level irrespective of signal amplitude. In FIG. 19, the reference numeral 10 denotes a light receiving element, 40 denotes an automatic discrimination level control circuit, 31 denotes a peak-hold circuit, 32 denotes a peak-hold circuit and 37, 38 denote adder circuits, respectively.

However, the shown optical receiver circuit cannot suppress offset transitionally varying according to elapsed time to significantly vary the duty ratio of the output waveform as shown in FIG. 19. Influence of transitional variation of offset according to elapsed time for fluctuation of duty ratio of the output waveform is particularly significant when a reception dynamic range having large level difference (about 30 dB in optical level) of respective burst signals and wide dynamic range is required upon receiving a burst form optical signal in optical access system, optical LAN, optical interconnection and so forth.

An example of a passive Optical Network (PON) to be employed when such wide reception dynamic range is required, is shown in FIG. 22. In FIG. 22, respective optical transmission signal from a plurality of optical subscriber line terminal units (Optical Network Unit: ONU) 1 to 3 are synthesized by a star coupler 4 and then received by an optical receiver 6 in an optical subscriber line Terminal Station Unit (Optical Line Termination:OLT) 5. As shown, in the PON system, levels of the optical signals transmitted from respective ONUs 1 to 3 in burst manner are different respectively. Thus, in the optical receiver 6, wide dynamic range is required as set forth above.

Now, consideration is given for the case where the optical receiver 6 shown in FIG. 22 receives small level burst signal B2 after reception of large level burst signal B1. By offset due to influence of the carrier having low spreading time constant generated while the large level burst signal B1 is received, this offset may reside even upon starting of reception of the small level burst signal B2 to slowly attenuate offset at low speed time constant while small level burst signal B2 is received. In this case, a ratio of variation in elapsed time of an offset level with respect to the signal amplitude becomes non-ignorably large to cause significant fluctuation of the duty ratio of the output waveform.

As a prior art for restricting transitionally varying offset according to elapsed time, there has been proposed an optical receiver disclosed in Japanese Unexamined Patent Publication No. Heisei 10-22521 (corresponding to U.S. Pat. No. 5,737,111). A construction of the optical receiver circuit and waveform at respective portion therein are illustrated in FIG. 21. In this optical receiver, by an offset detection circuit constructed with a resistor and a capacitor, a voltage value corresponding to an offset current varying transitionally according to elapse of time, is detected. In a current drawing circuit, the detected voltage value is converted into a current to withdraw from the output current of the light receiving element. Then, the output current withdrawn the current is fed to a pre-amplifier 20. By this, an offset varying transitionally according to elapse of time can be canceled to restrict variation of the duty ratio of the output waveform.

However, in general, since the waveform of the offset current according to elapsed time which varies transitionally according to elapsed time, is different per each individual light receiving element. Therefore, in the prior art disclosed in Japanese Unexamined Patent Publication No. 10-22521, the resistance value of the resistors forming offset detecting circuit has to be adjusted individually per each individual light receiving element. Thus, the resistor has to be variable of the resistance value. For this reason, a variable resistor has to be mounted out of the chip and thus is not suited for integration of the receiving circuit into one chip. Furthermore, the resistor mounted outside of the chip inherently hinder down-sizing of the optical receiver. On the other hand, since adjustment is required for each optical receiver to incur adjustment cost for every optical receiver and thus is not suited for lowering of cost. Furthermore, since the offset detecting circuit is inserted between the light receiving element and the maximum potential power source, a bias value to be applied to the light receiving element is lowered in the extent corresponding to potential drop by the offset detecting circuit.

SUMMARY OF THE INVENTION

An object of the present invention to provide an offset control circuit which can obtain an output waveform free of fluctuation of duty ratio by canceling offset transitionally varying according to elapsed time even upon reception of an optical signal in burst form significantly variable of level difference, an optical receiver employing the same and an optical communication system.

Another object of the present invention is to provide an offset control circuit which can be realized in a form suited for integration of a receiving circuit into one chip without requiring individual adjustment by an external element, an optical receiver employing the same and an optical communication system.

According to the first aspect of the present invention, an offset control circuit comprises offset canceling means for canceling an offset component included in a pair of positive-phase and negative-phase signals and varying transitionally according to elapse of time by using at least one of a peak value and a bottom value of the positive-phase and negative-phase signals.

In the preferred construction, the offset canceling means includes a peak value holding circuit and a bottom value holding circuit holding a peak value and a bottom value of the positive-phase signals and arithmetic means for performing operation by connecting outputs of the hold circuits with the negative-phase signal in feed forward connection. In such case, the arithmetic means may include an adder circuit adding the negative-phase signal and the output signals of the peak value holding circuit and the bottom value holding circuit at substantially the same ratio.

In the alternative, the offset canceling means may include a peak value holding circuit and a bottom value holding circuit holding a peak value and a bottom value of the negative-phase signal and arithmetic means for performing operation by connecting outputs of the hold circuits with the positive-phase signal in feedforward connection. The arithmetic means may include an adder circuit adding the positive-phase signal and the output signals of the peak value holding circuit and the bottom value holding circuit at substantially the same ratio.

In the further alternative, the offset canceling means may include a first peak value holding circuit holding a peak value of the positive-phase signal, a second peak value holding circuit for holding a peak value of the negative-phase signal, a first bottom value holding circuit holding a bottom value of the positive-phase signal and a second bottom value holding circuit holding a bottom value of the negative-phase signal and arithmetic means for performing operation by connecting outputs of the hold circuits with the positive-phase and negative-phase signals in feedforward connection. The arithmetic means may include a first adder circuit adding the positive-phase signal, an output signal of the second peak value holding circuit and an output signal of the second bottom value holding circuit at substantially the same ratio, and a second adder circuit adding the negative-phase signal, an output signal of the first peak value holding circuit and an output signal of the first bottom value holding circuit at substantially the same ratio.

In the still further alternative, the offset canceling means may include a first peak value holding circuit holding a peak value of the positive-phase signal and a second peak value holding circuit for holding a peak value of the negative-phase signal, and arithmetic means for performing operation by connecting outputs of the hold circuits with the positive-phase and negative-phase signals in feedforward connection. The arithmetic means may includes a first adder circuit adding the positive-phase signal and an output signal of the second peak value holding circuit at a ratio of substantially 1:2, and a second adder circuit adding the negative-phase signal and an output signal of the first peak value holding circuit at a ratio of substantially 1:2, and a differential amplifier circuit taking output signals of the first and second adder circuits as inputs.

In the yet further alternative, the offset canceling means may includes a first bottom value holding circuit holding a bottom value of the positive-phase signal and a second bottom value holding circuit for holding a bottom value of the negative-phase signal, and arithmetic means for performing operation by connecting outputs of the hold circuits with the positive-phase and negative-phase signals in feedforward connection. The arithmetic means may include a first adder circuit adding the positive-phase signal and an output signal of the second bottom value holding circuit at a ratio of substantially 1:2, and a second adder circuit adding the negative-phase signal and an output signal of the first bottom value holding circuit at a ratio of substantially 1:2, and a differential amplifier circuit taking output signals of the first and second adder circuits as inputs.

In the still further alternative, the offset canceling means may include a bottom value holding circuit holding a bottom value of the positive-phase signal and arithmetic means for performing operation by connecting outputs of the hold circuit with the negative-phase signal in feedforward connection. The arithmetic means include an adder circuit adding the negative-phase signal and the output signals of the bottom value holding circuit at substantially the same ratio.

In the yet further alternative, the offset canceling means may include a peak value holding circuit holding a peak value of the negative-phase signal and arithmetic means for performing operation by connecting outputs of the hold circuit with the positive-phase signal in feedforward connection. In such case, the arithmetic means may include an adder circuit adding the positive-phase signal and the output signals of the peak value holding circuit at substantially the same ratio.

In the yet further embodiment, the offset canceling means may include a bottom value holding circuit holding a bottom value of the positive-phase signal and a peak value holding circuit holding a peak value of the negative-phase signal and arithmetic means for performing operation by connecting outputs of the hold circuit with the positive-phase and negative-phase signal in feedforward connection. The arithmetic means may include a first adder circuit adding the positive-phase signal and the output signals of the peak value holding circuit at substantially the same ratio and a second adder circuit adding the negative-phase signal and the output signals of the bottom value holding circuit at substantially the same ratio.

In the still further alternative, the offset canceling means may include a peak value holding circuit holding a peak value of the negative-phase signal and arithmetic means for performing operation by connecting the output signal of the hold circuit with the positive-phase signal in feedforward connection. The arithmetic means may include an adder circuit adding the positive-phase signal and an output signal of the peak value holding circuit at a ratio of substantially 1:2, and a differential amplifier circuit taking the output signal of the adder circuit and the negative-phase signal as inputs.

In the yet further alternative, the offset canceling means may includes a bottom value holding circuit holding a bottom value of the positive-phase signal and arithmetic means for performing operation by connecting outputs of the hold circuit with the negative-phase signal in feedforward connection. The arithmetic means may includes an adder circuit adding the negative-phase signal and an output signal of the peak value holding circuit at a ratio of substantially 1:2, and a differential amplifier circuit taking the output signal of the adder circuit and the positive-phase signal as inputs.

The offset control circuit may further comprise means for resetting held values of the peak value holding circuit and/or the bottom value holding circuit by inputting an external control signal.

According to the second aspect of the present invention, an optical receiver includes an offset control circuit having a construction as set forth above, a light receiving element receiving an optical input signal and a pre-amplifier amplifying an output of the light receiving element, wherein a pair of outputs of the pre-amplifier is taken as the positive-phase signal and the negative-phase signal of the offset control circuit.

The optical receiver may further comprise a discrimination level control circuit for automatically setting a threshold value for discrimination of the output signal of the offset control circuit.

According to the third aspect of the present invention, an optical communication system may employ an optical receiver as set forth above. The optical communication system may comprise a plurality of optical subscriber line terminal units transmitting a burst form optical signals at mutually different levels and an optical subscriber line terminal office unit receiving the burst form optical signals, wherein the optical subscriber line terminal office unit has the optical receiver. The held value of the peak value holding circuit and/or the bottom value holding circuit are reset within a guard time presenting between the burst form optical signal.

Operations of the present invention will be discussed. the offset component including a pair of positive-phase and the negative-phase signals and which varies transitional fashion, may be canceled using the offset component included in at least one of the peak value or the bottom value, and varying transitionally according to elapsed time. Upon cancellation, the positive-phase signal and the negative-phase signal are and at least one of the peak value and the bottom value are connected in feedforward manner to cancel the transitionally varying offset mutually.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings:

FIG. 2 is a waveform chart at respective portions of the first embodiment of the offset control circuit according to the present invention;

FIG. 4 is a waveform chart at respective portions of the second embodiment of the offset control circuit according to the present invention;

FIG. 8 is a waveform chart at respective portions of the fourth embodiment of the offset control circuit according to the present invention;

FIG. 10 is a waveform chart at respective portions of the fifth embodiment of the offset control circuit according to the present invention;

FIG. 18 is a waveform chart at respective portions of the ninth embodiment of the offset control circuit according to the present invention;

FIG. 19 is a block diagram and waveform charts of a light receiving circuit having a function for controlling a given level of offset;

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific details.

Figure 1:
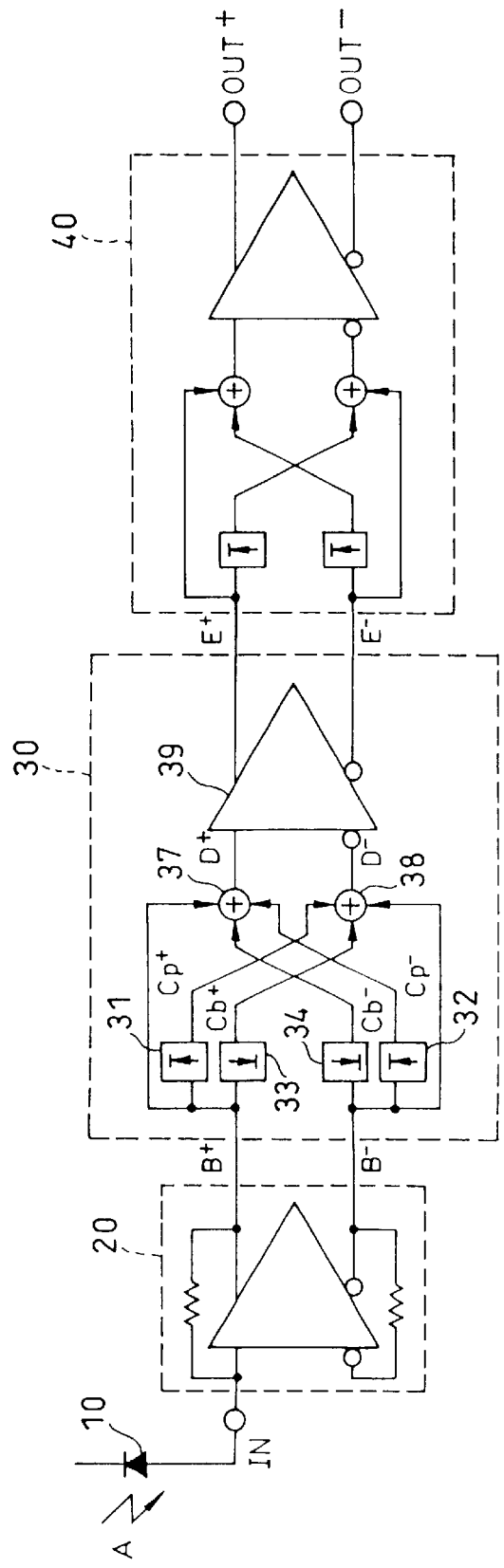
FIG. 1 is a block diagram showing an optical receiver including the first embodiment of an offset control circuit according to the present invention.

FIG. 1 is a block diagram showing an optical receiver including the first embodiment of an offset control circuit according to the present invention. In FIG. 1, an optical receiver is constructed with a light receiving element 10 outputting a current signal in response to input of an optical signal A, a pre-amplifier circuit 20 converting an output current signal of the light receiving element into a voltage signal and amplifying the voltage signal for outputting a differential voltage signal (B$^+$, B$^-$), an offset control circuit according to the present invention which cancels an offset varying transitionally according to an elapsed time, and a discrimination level control circuit 40 eliminating an offset of a constant level not varying according to elapsed time and setting a threshold value for discriminating logical "0" level and logical "1" level.

In FIG. 1, a differential transimpedance amplifier circuit using a feedback resistor is employed as the pre-amplifier. However, any transimpedance amplifier circuit which can output a differential voltage signal in response to input of a current signal may be employed in place. Also, in FIG. 1, as the discrimination level control circuit, a circuit equivalent or comparable with that disclosed in Japanese Unexamined Patent Publication No. 8-84160 (corresponding to U.S. Pat. No. 5,612,810). The disclosure of the above-identified U.S. Pat. No. 5,612,810 is herein incorporated by reference. However, any circuit which has a function to eliminate or cancel the offset of constant level not variable according to elapsed time and can set a threshold value for discriminating the logical "0" level and the logical "1" level, may be applicable. For example, circuits disclosed in Japanese Unexamined Patent Publication No. Heisei 6-232917 (corresponding to U.S. Pat. No. 5,371,763), Japanese Unexamined Patent Publication No. Heisei 7-15343, Japanese Unexamined Patent Publication No. Heisei 7-142935, Japanese Unexamined Patent Publication No. Heisei 10-84231 (corresponding to U.S. Pat. No. 5,892,609) and U.S. Pat. No. 5,025,456 may be useful.

Hereinafter, the operation of the first embodiment of the offset control circuit according to the present invention will be discussed with reference to FIG. 1. The first embodiment of the offset control circuit 30 according to the present invention is constructed with peak value holding circuits 31 and 32 and bottom value holding circuits 33, 34, respectively holding a peak value and a bottom value of a positive-phase and a negative-phase outputs (B$^+$, B$^-$) of the pre-amplifier circuit 20, and adder circuits 37, 38, respectively adding outputs (Cp$^+$, Cp$^-$) and (Cb$^+$, Cb$^-$) of the peak value holding circuits and the bottom value holding circuits corresponding to the positive-phase and negative-phase outputs of the pre-amplifier 20. In FIG. 1, there is illustrated a differential amplifier circuit 39 which amplifies outputs (D$^+$, D$^-$) of the adder circuits 37, 38. However, in the shown embodiment of the offset control circuit, the differential amplifier circuit 39 is not particularly necessary.

In the adder circuit 37, the positive-phase output B$^+$ of the pre-amplifier circuit 20, the peak value Cp$^-$ of the negative-phase output of the pre-amplifier circuit 20 and the bottom value Cb$^-$ of the negative-phase output of the pre-amplifier circuit 20 are added. On the other hand, in the adder circuit 38, the negative-phase output B$^-$ of the pre-amplifier circuit 20, the peak value Cp$^+$ of the positive output of the pre-amplifier circuit 20 and the bottom value Cb$^+$ of the positive-phase output of the pre-amplifier circuit 20 are added.

FIG. 2 is a waveform chart at respective portions of the first embodiment of the offset control circuit according to the present invention. A signal component in the output of the pre-amplifier is assumed as V1(t) (signal amplitude is assumed to be constant at V1), an offset component is assumed to be v1(t) (monotonic increase). Then, the positive-phase and the negative-phase output voltages (B$^+$, B$^-$) of the pre-amplifier are expressed by:

$$B^+ = V1(t) + v1(t) \quad (1)$$

$$B^- = -V1(t) - v1(t) \quad (2)$$

On the other hand, output voltages of the peak value holding circuit and the bottom value holding circuit are positive-phase and negative-phase and respectively expressed by:

$$Cp^+ = V1 + v1(t) \quad (3)$$

$$Cb^+ = v1(t1) \quad (4)$$

$$Cp^- = -v1(t1) \quad (5)$$

$$Cb^- = -V1 - v1(t) \quad (6)$$

Here, holding of the peak value and the bottom value is performed at a timing of t=t1. An output voltages (D$^+$, D$^-$) of the adder circuits are respectively:

$$\begin{aligned} D^+ &= B^+ + Cp^- + Cb^- \\ &= V1(t) - V1 - v1(t1) \end{aligned} \quad (7)$$

$$\begin{aligned} D^- &= B^- + Cp^+ + Cb^+ \\ &= -(V1(t) - V1 - v1(t1)) \end{aligned} \quad (8)$$

Therefore, assuming a gain of the differential amplifier 39 is K, the output voltages (E$^+$, E$^-$) of the differential amplifier 39 are respectively:

$$\begin{aligned} E^+ &= K(D^+ - D^-) \\ &= 2K(V1(t) - V1 - v1(t1)) \end{aligned} \quad (9)$$

$$\begin{aligned} E^- &= -K(D^+ - D^-) \\ &= -2K(V1(t) - V1 - v1(t1)) \end{aligned} \quad (10)$$

These do not contain v1(t), the offset component varying transitionally according to elapsed time is completely canceled and only offset component of a given constant level is left. Accordingly, by inputting the output voltages (D$^+$, D$^-$) of the adder circuit or the output voltages (E$^+$, E$^-$) of the differential amplifier to the discrimination level control circuit or the like disclosed in Japanese Unexamined Patent Publication No. Heisei 8-84160, the offset component of the given constant level is also canceled. Thus, an output waveform with no fluctuation of the duty ratio can be obtained.

As set forth above, in the first embodiment, the positive-phase and the negative-phase outputs of the pre-amplifier circuit 20 are applied to the peak value holding circuits 31, 32 and the bottom value holding circuits 33, 34 which are connected to the adder circuits 37 and 38 in feed-forward connection for completely canceling offset transitionally varying according to elapsed time. Respective circuit blocks forming the shown embodiment of the offset control circuit is unnecessary to perform adjustment with the external element. Therefore, the shown embodiment is suited for integration into one chip and thus contributes for providing compact and low cost optical receiver.

Figure 3:
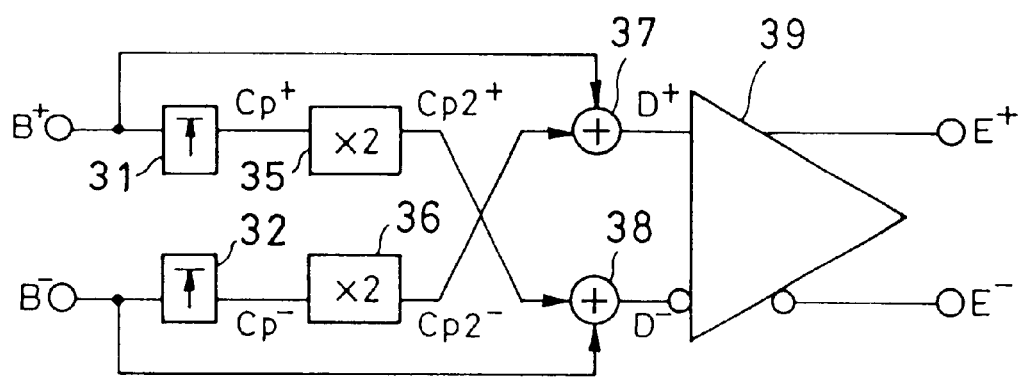
FIG. 3 is a block diagram showing the second embodiment of an offset control circuit according to the present invention.

Next, discussion will be given for the second embodiment of the offset control circuit according to the present invention. FIG. 3 is a block diagram showing the second embodiment of the offset control circuit according to the present invention. In FIG. 3, the same or equivalent portions with the offset control circuit of FIG. 1 will be identified by the same reference numerals, and the disclosure for those common components will be omitted in the following disclosure in order to avoid redundant disclosure and whereby to keep the disclosure simple enough to facilitate clear understanding of the present invention. The second embodiment is differentiated from the first embodiment shown in FIG. 1 in using only peak value holding circuit, adding doubling circuits 35 and 36 which double held peak values and using the differential amplifier circuit 39 amplifying the outputs ($D^+$, $D^-$) of the adder circuits 37, 38 as inherent circuit. Hereinafter, the second embodiment of the offset control circuit according to the present invention will be discussed in detail.

The second embodiment of the offset control circuit according to the present invention is constructed with peak value holding circuits 31, 32, respectively holding peak values of the positive-phase and the negative-phase outputs ($B^+$, $B^-$) of the pre-amplifier 20, doubling circuits 35, 36 for doubling the outputs of the peak value holding circuits 31, 32, adder circuits 37, 38 for adding the positive-phase and negative-phase outputs ($B^+$, $B^-$) of the pre-amplifier 20 and outputs ($Cp^+$, $Cp^-$) of the doubling circuit corresponding to the positive-phase and negative-phase outputs, and the differential amplifier 39 for amplifying the outputs ($D^+$, $D^-$) of the adder circuits 37, 38.

In the adder circuit 37, the positive-phase output $B^+$ of the pre-amplifier 20 and a doubled value $Cp2^-$ of the peak of the negative-phase output of the pre-amplifier 20 are added. On the other hand, in the adder circuit 38, the negative-phase output $B^-$ of the pre-amplifier 20 and the doubled value $Cp2^+$ of the peak of the positive-phase output of the pre-amplifier 20 are added.

FIG. 4 is a waveform chart at respective portions of the second embodiment of the offset control circuit according to the present invention as illustrated in FIG. 3. Similarly to the first embodiment, the signal component in the output of the pre-amplifier is assumed as V1(t) (the signal amplitude is assumed to be constant at V1), the offset component is assumed as v1(t) (monotonic increase), the positive-phase and the negative-phase output voltages ($B^+$, $B^-$) of the pre-amplifier are expressed by the foregoing equations (1) and (2). On the other hand, the output voltages ($Cp2^+$, $Cp2^-$) of the doubling circuit are respectively expressed as follows:

$$Cp2^+ = 2(V1+v1(t)) \quad (11)$$

$$Cp2^- = -2v1(t) \quad (12)$$

Here, the holding of the peak value is performed from a timing t=t1.

Output voltages ($D^+$, $D^-$) of the adder circuit are respectively expressed by:

$$D^+ = B^+ + Cp2^- \quad (13)$$

$$D^- = B^- + Cp2^+ \quad (14)$$

Therefore, assuming that K as the gain of the differential amplifier 39, the output voltages ($E^+$, $E^-$) are respectively expressed by:

$$E^+ = K(D^+ - D^-) = K(B^+ - B^- - Cp2^+ + Cp2^-) \quad (15)$$
$$= 2K(V1(t) - V1 - v1(t1))$$

$$E^- = -K(D^+ - D^-) = -K(B^+ - B^- - Cp2^+ + Cp2^-) \quad (16)$$
$$= -2K(V1(t) - V1 - v1(t1))$$

These do not contain v1(t), the offset component varying transitionally according to elapsed time is completely canceled and only offset component of a given constant level is left. Accordingly, by inputting the output voltages ($E^+$, $E^-$) of the differential amplifier 39 to the discrimination level control circuit or the like disclosed in Japanese Unexamined Patent Publication No. Heisei 8-84160, the offset component of the given constant level is also canceled. Thus, an output waveform with no fluctuation of the duty ratio can be obtained.

Figure 5:
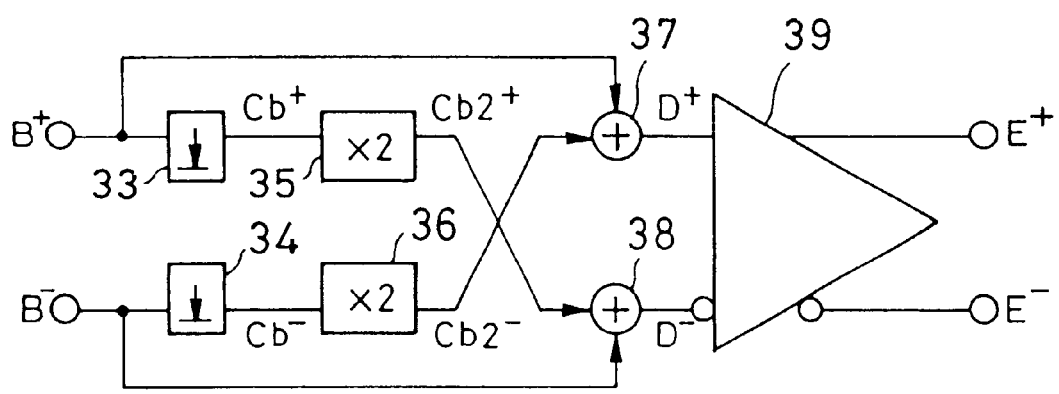
FIG. 5 is a block diagram the showing third embodiment of an offset control circuit according to the present invention.

Next, discussion will be given for the third embodiment of the offset control circuit according to the present invention. FIG. 5 is a block diagram showing the third embodiment of the offset control circuit according to the present invention. In FIG. 5, the same or equivalent portions with the offset control circuit of FIG. 1 or 3 will be identified by the same reference numerals, and the disclosure for those common components will be omitted in the following disclosure in order to avoid redundant disclosure and whereby to keep the disclosure simple enough to facilitate clear understanding of the present invention. The third embodiment is differentiated from the second embodiment shown in FIG. 3 in only using the bottom value holding circuit in place of the peak value holding circuit. Hereinafter, the third embodiment of the offset control circuit according to the present invention will be discussed in detail.

Figure 6:
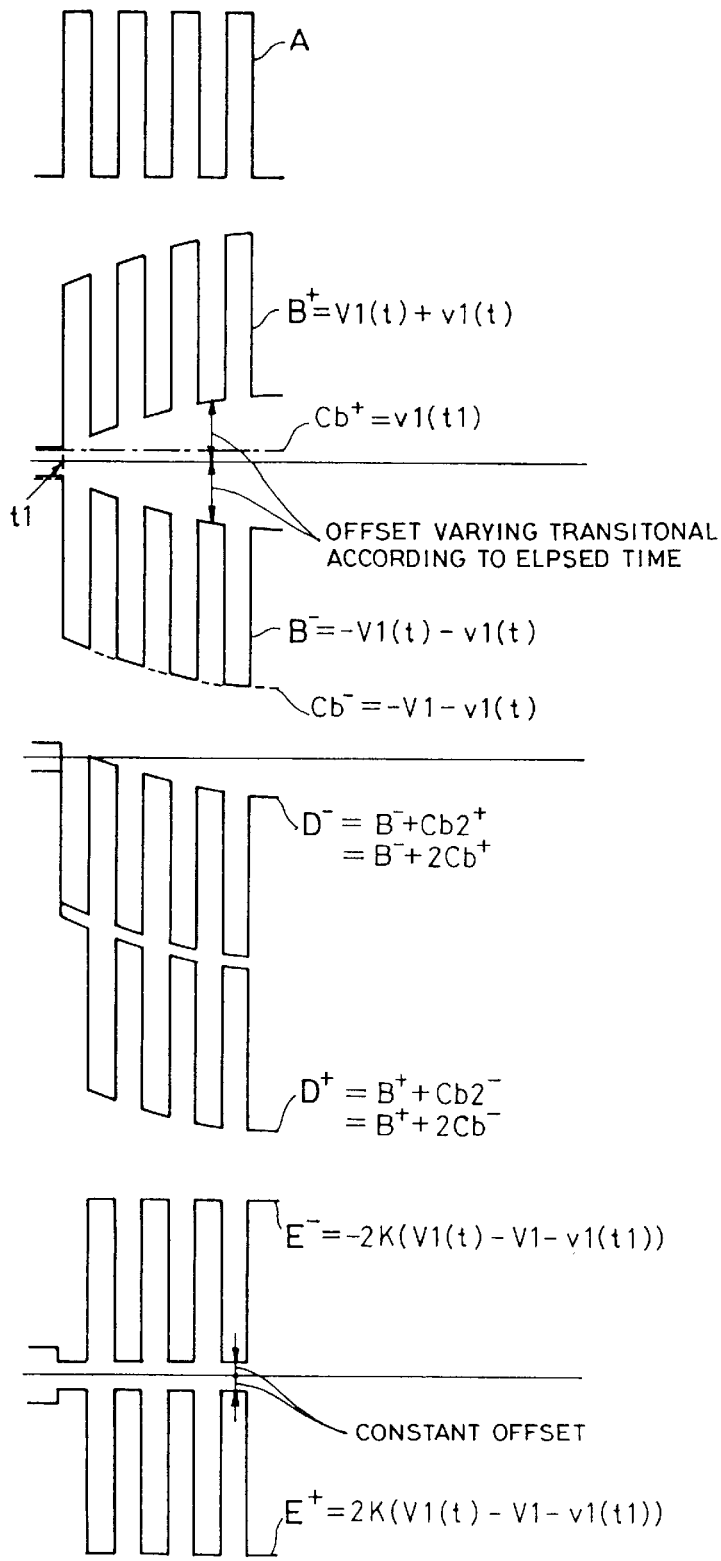
FIG. 6 is a waveform chart at respective portions of the third embodiment of the offset control circuit according to the present invention.

FIG. 6 is a waveform chart at respective portions of the third embodiment of the offset control circuit according to the present invention as illustrated in FIG. 5. Similarly to the first embodiment, the signal component in the output of the pre-amplifier is assumed as V1(t) (the signal amplitude is assumed to be constant at V1), the offset component is assumed as v1(t) (monotonic increase), the positive-phase and the negative-phase output voltages ($B^+$, $B^-$) of the pre-amplifier are expressed by the foregoing equations (1) and (2). On the other hand, the output voltages ($Cb2^+$, $Cb2^-$) of the doubling circuit are respectively expressed as follows:

$$Cb2^{+=2} v1(t1) \quad (17)$$

$$Cb2^{-=-2}(V1+v1(t)) \quad (18)$$

Here, the holding of the bottom value is performed from a timing t=t1.

Output voltages ($D^+$, $D^-$) of the adder circuit are respectively expressed by:

$$D^+ = B^+ + Cb2^- \quad (19)$$

$$D^- = B^- + Cb2^+ \quad (20)$$

Therefore, assuming that K as the gain of the differential amplifier 39, the output voltages ($E^+$, $E^-$) are respectively expressed by:

$$E^+ = K(D^+ - D^-) = K(B^+ - B^- - Cb2^+ + Cb2^-) \quad (21)$$
$$= 2K(V1(t) - V1 - v1(t1))$$

-continued $$E^- = -K(D^+ - D^-) = -K(B^+ - B^- - Cb2^+ + Cb2^-) \quad (22)$$
$$= -2K(V1(t) - V1 - v1(t1))$$

These do not contain v1(t), the offset component varying transitionally according to elapsed time is completely canceled and only offset component of a given constant level is left. Accordingly, by inputting the output voltages ($E^+$, $E^-$) of the differential amplifier 39 to the discrimination level control circuit or the like disclosed in Japanese Unexamined Patent Publication No. Heisei 8-84160, the offset component of the given constant level is also canceled. Thus, an output waveform with no fluctuation of the duty ratio can be obtained.

As set forth above, in the second and third embodiments, the positive-phase and the negative-phase outputs of the pre-amplifier 20 are applied to the peak value holding circuits 31, 32 or the bottom value holding circuits 33, 34. The output values of the peak value holding circuits 31, 32 or the bottom value holding circuits 33, 34 are doubled by the doubling circuit. The outputs of the doubling circuit is connected to the adder circuits 37, 38 in feedforward connection. Then, a difference of the adder outputs is amplified to completely cancel offset varying transitionally according to elapsed time.

Respective circuit blocks forming the second and third embodiments of the offset control circuits do not require adjustment by the external element. Therefore, the second and third embodiments of the offset control circuits are well suited for integration into one chip to contribute for downsizing and lowering of cost of the optical receiver.

Next, embodiments of the offset control circuit added functions for the first, second and third embodiments of the offset control circuits will be discussed as the fourth, fifth and sixth embodiments of the present invention. The following discussion for the fourth, fifth and sixth embodiment, will be given in terms of reception of a burst optical signal, in which level difference is significantly different. FIGS. 7, 8, 9, 10, 11 and 12 are block diagrams and waveform charts of respective portions showing the fourth, fifth and sixth embodiments of the offset control circuit (or the optical receiver including the offset control circuit).

Figure 7:
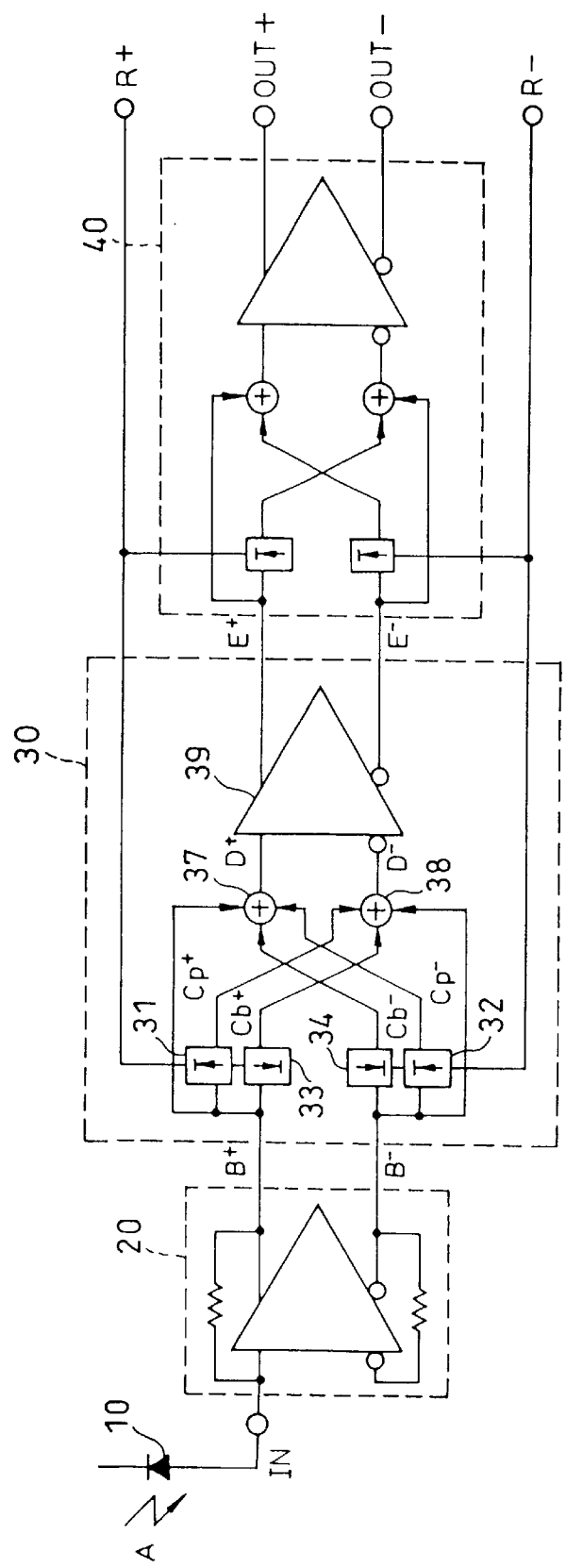
FIG. 7 is a block diagram showing an optical receiver including the fourth embodiment of an offset control circuit according to the present invention.
Figure 9:
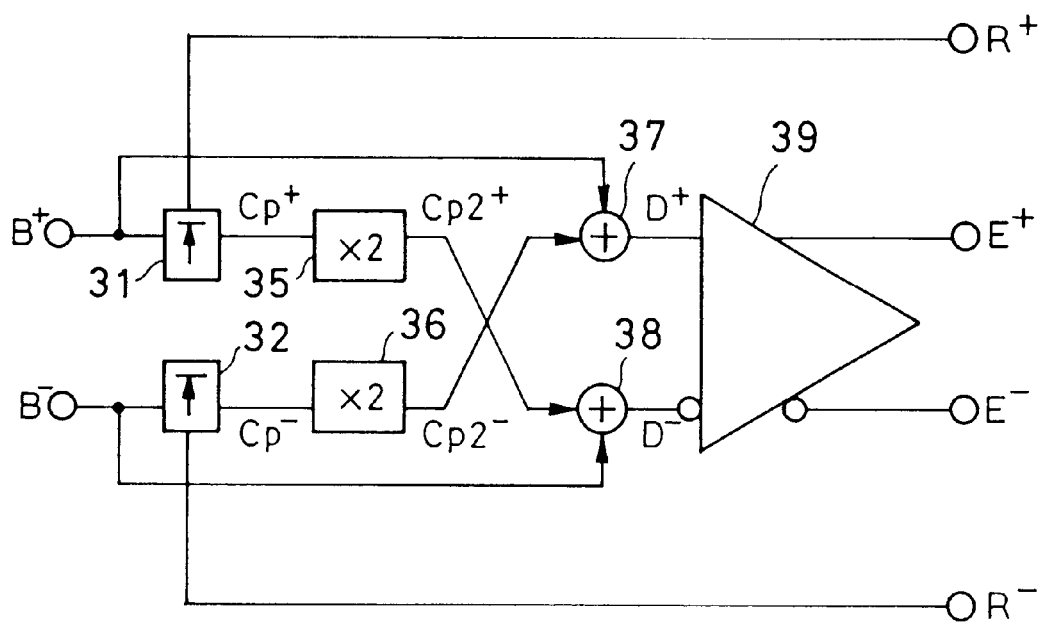
FIG. 9 is a block diagram showing the fifth embodiment of an offset control circuit according to the present invention.
Figure 11:
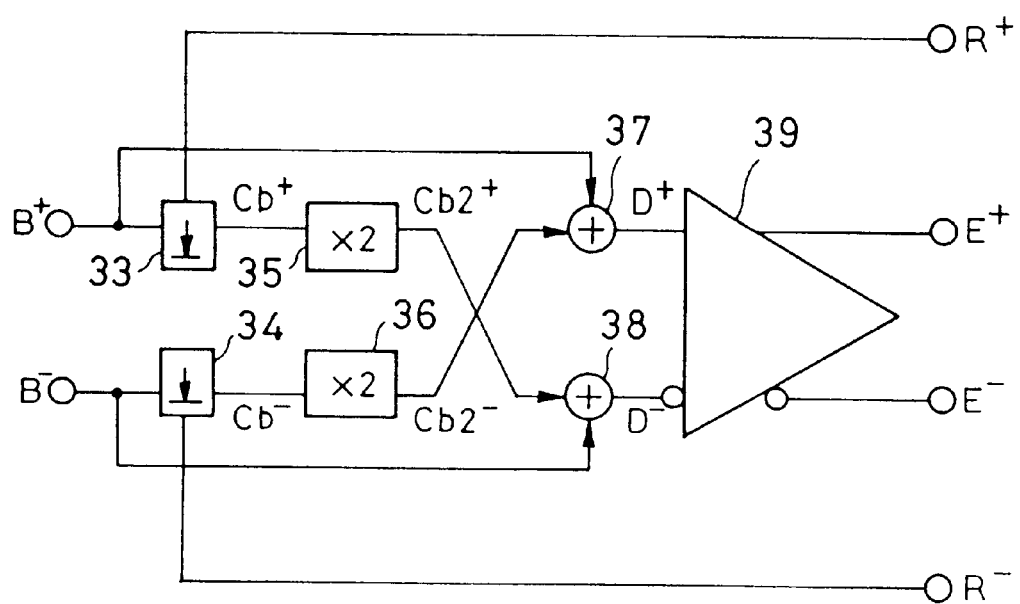
FIG. 11 is a block diagram showing the sixth embodiment of an offset control circuit according to the present invention.

In the block diagrams of FIGS. 7, 9 and 11, the same or equivalent portions with the first, second and third embodiments of the offset control circuit of FIGS. 1, 3 and 5 will be identified by the same reference numerals, and the disclosure for those common components will be omitted in the following disclosure in order to avoid redundant disclosure and whereby to keep the disclosure simple enough to facilitate clear understanding of the present invention. What is different from the embodiments shown in FIGS. 1, 3 and 5 is addition of a function for resetting the peak value or the bottom value held in the peak value holding circuits 31, 32 or the bottom value holding circuits 33, 34 by an external signal. Reset signals ($R^+$, $R^-$) for performing resetting operation are input within a period up to initiation of reception of the next burst signal (guard time).

Hereinafter, operation of the fourth embodiment of the offset control circuit according to the present invention will be discussed in detail with reference to the waveform charts of respective portions shown in FIG. 8. FIG. 8 is waveform charts of respective portions in the offset control circuit 30 shown in FIG. 7 when a small level burst signal B2 is received after reception of the large level burst signal B1. By offset due to influence of the carrier having slow spreading time constant generated by the light receiving element 10 while the large burst signal B1 is received, offset may resides even upon initiation of reception of the small level burst signal B2 to gradually attenuate the offset with large time constant even during reception of the small level burst signal B2.

The operation while receiving the large level burst signal is identical to that of the first embodiment, and thus offset can be canceled completely. Therefore, hereinafter, discussion will be given for operation at a reset timing t=t2 and subsequent timing. The signal component in the output of the pre-amplifier is assumed as V2(t) (the signal amplitude is assumed to be constant at V2), the offset component is assumed as v2(t) (monotonic increase). Them the positive-phase and the negative-phase output voltages ($B^+$, $B^-$) of the pre-amplifier will be respectively expressed by:

$$B^+ = V2(t) + v2(t) \quad (23)$$

$$B^- = -V2(t) - v2(t) \quad (24)$$

On the other hand, when reception of the large level burst signal B1 is completed, the peak value or the bottom value of the peak value holding circuit or the bottom value holding circuit is reset. The output voltage of the peak value holding circuit and the bottom value holding circuit in positive-phase and negative-phase may be respectively expressed by:

$$Cp^+ = v2(t2) \text{ (or } V2 + v2(t2)) \quad (25)$$

$$Cb^+ = v2(t) \quad (26)$$

$$Cp^- = -v2(t) \quad (27)$$

$$Cb^- = -v2(t2) \text{ (or } -V2 - v2(t2)) \quad (28)$$

The output voltage ($D^+$, $D^-$) of the adder circuits are respectively expressed by:

$$D^+ = B^+ + Cp^- + Cb^- \quad (29)$$
$$= V2(t) - v2(t2)$$
$$(\text{or } V2(t) - V2 - v2(t2))$$

$$D^- = B^- + Cp^- + Cb^+ \quad (30)$$
$$= -(V2(t) - v2(t2))$$
$$(\text{or } -(V2(t) - V2 - v2(t2)))$$

Accordingly, assuming the gain of the differential amplifier circuit 39 is K, the output voltages ($E^+$, $E^-$) are respectively expressed by:

$$E^+ = K(D^+ - D^-) \quad (31)$$
$$= 2K(V2(t) - v2(t2))$$
$$(\text{or } 2K(V2(t) - V2 - v2(t2)))$$

$$E^- = -K(D^+ - D^-) \quad (32)$$
$$= -2K(V2(t) - v2(t2))$$
$$(\text{or } -2K(V2(t) - V2 - v2(t2)))$$

These do not contain v2(t), therefore, during the reception of the small level burst signal B2, the offset component varying transitionally according to elapsed time is completely canceled and only offset component of a given constant level is left. Accordingly, by inputting the output voltage ($D^+$, $D^-$) of the adder circuit or the output voltages ($E^+$, $E^-$) of the differential amplifier to the discrimination level control circuit or the like disclosed in Japanese Unexamined Patent Publication No. Heisei 8-84160, the offset component of the given constant level is also canceled. Thus, an output waveform with no fluctuation of the duty ratio can be obtained.

As set forth above, in the shown embodiment, the construction, in which the function for resetting the peak value and the bottom value of the peak value holding circuits 31, 32 and the bottom value holding circuits 33, 34, are added to the first embodiment. By this, even upon reception of the burst optical signal having significantly large level difference, the offset transitionally varying according to elapsed time can be completely canceled. Respective circuit blocks forming the shown embodiment of the offset control circuit is unnecessary to perform adjustment with the external element. Therefore, the shown embodiment is suited for integration into one chip and thus contributes for providing compact and low cost optical receiver.

Next, operation of the fifth embodiment of the offset control circuit according to the present invention will be discussed in detail with reference to the waveform charts of respective portions shown in FIG. 10. FIG. 10 is waveform charts of respective portions in the offset control circuit 30 shown in FIG. 9 when a small level burst signal B2 is received after reception of the large level burst signal B1. For the similar reason that discussed in connection with the fourth embodiment, discussion will be given for operation at a reset timing t=t2 and subsequent timing.

Similarly to the fourth embodiment, the signal component in the output of the pre-amplifier is assumed as V2(t) (the signal amplitude is assumed to be constant at V2), the offset component is assumed as v2(t) (monotonic increase). Then the positive-phase and the negative-phase output voltages (B$^+$, B$^-$) of the pre-amplifier will be expressed by the foregoing equations (23) and (24). On the other hand, upon completion of reception of the large level burst signal B1, the peak value held in the peak value holding circuit is reset. Therefore, the output voltages (Cp$^+$, Cp$^-$) of the doubling circuit can be respectively expressed by:

$$Cp2^+ = 2v2(t2) \text{ (or } 2V2+v2(t2)) \tag{33}$$

$$Cp2^- = -2v2(t) \tag{34}$$

The output voltage (D$^+$, D$^-$) of the adder circuits are respectively expressed by the foregoing equations (13) and (14). Thus, assuming the gain of the differential amplifier circuit 39 is K, the output voltages (E$^+$, E$^-$) are respectively expressed by:

$$\begin{aligned} E^+ &= K(D^+ - D^-) = K(B^+ - B^- - Cp2^+ + Cp2^-) \\ &= 2K(V2(t) - v2(t2)) \\ (\text{or } & 2K(V2(t) - V2 - v2(t2))) \end{aligned} \tag{35}$$

$$\begin{aligned} E^- &= -K(D^+ - D^-) = K(B^+ - B^- - Cp2^+ + Cp2^-) \\ &= -2K(V2(t) - v2(t2)) \\ (\text{or } & -2K(V2(t) - V2 - v2(t2))) \end{aligned} \tag{36}$$

These do not contain v2(t), therefore during the reception of the small level burst signal B2, the offset component varying transitionally according to elapsed time is completely canceled and only offset component of a given constant level is left. Accordingly, by inputting the output voltages (E$^+$, E$^-$) of the differential amplifier to the discrimination level control circuit or the like disclosed in Japanese Unexamined Patent Publication No. Heisei 8-84160, the offset component of the given constant level is also canceled. Thus, an output waveform with no fluctuation of the duty ratio can be obtained.

Figure 12:
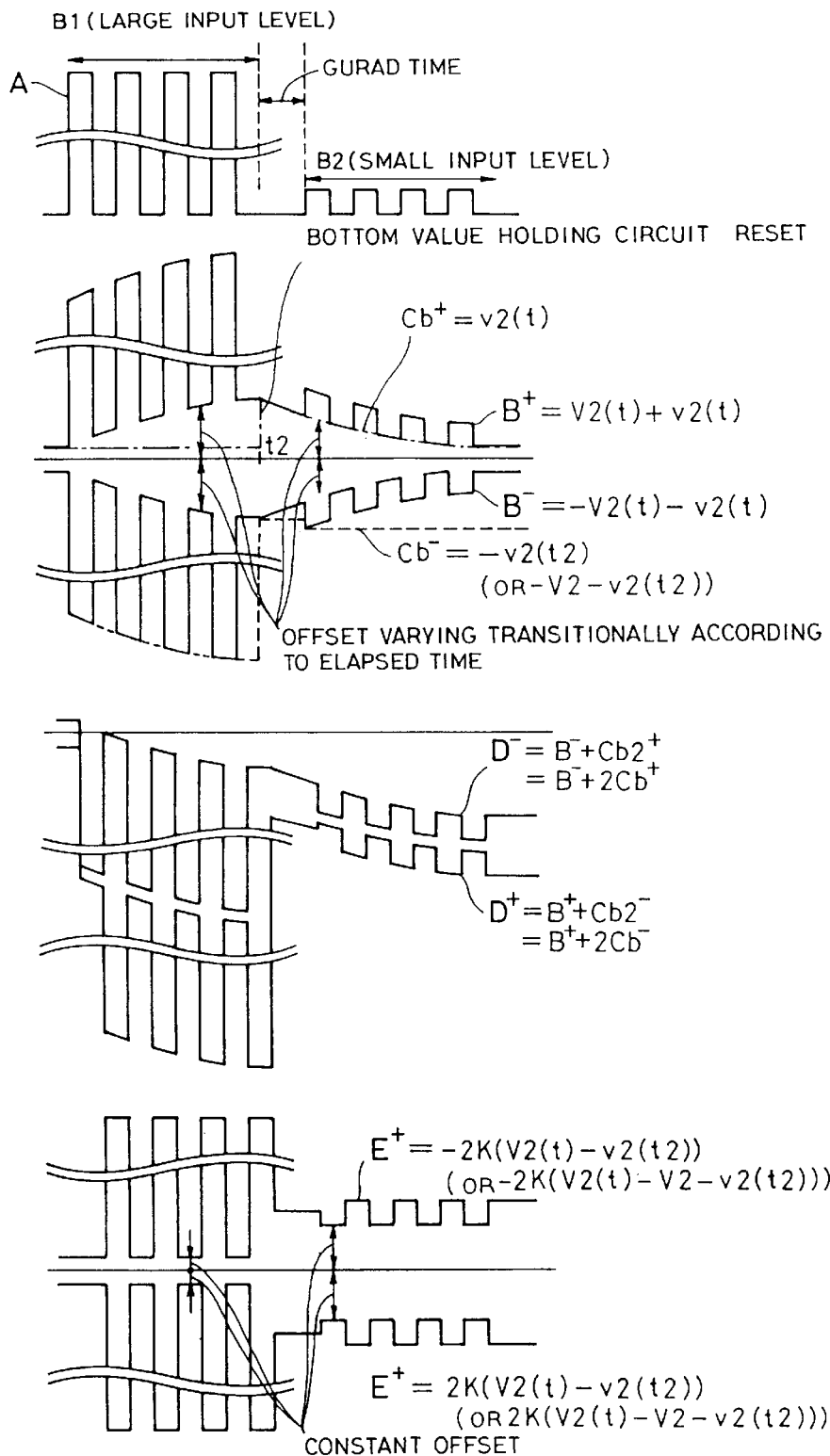
FIG. 12 is a waveform chart at respective portions of the sixth embodiment of the offset control circuit according to the present invention.

Next, operation of the sixth embodiment of the offset control circuit according to the present invention will be discussed in detail with reference to the waveform charts of respective portions shown in FIG. 12. FIG. 12 is waveform charts of respective portions in the offset control circuit shown in FIG. 11 when a small level burst signal B2 is received after reception of the large level burst signal B1. For the similar reason that discussed in connection with the fourth embodiment, discussion will be given for operation at a reset timing t=t2 and subsequent timing.

Similarly to the fourth embodiment, the signal component in the output of the pre-amplifier is assumed as V2(t) (the signal amplitude is assumed to be constant at V2), the offset component is assumed as v2(t) (monotonic increase). Them the positive-phase and the negative-phase output voltages (B$^+$, B$^-$) of the pre-amplifier will be expressed by the foregoing equations (23) and (24). On the other hand, upon completion of reception of the large level burst signal B1, the bottom value held in the bottom value holding circuit is reset. Therefore, the output voltages (Cb2$^+$, Cb2$^-$) of the doubling circuit can be respectively expressed by:

$$Cb2^+ = -2v2(t2) \tag{37}$$

$$Cb2^- = -2v2(t) \text{ (or } -2(V2-v2(t2))) \tag{38}$$

The output voltage (D$^+$, D$^-$) of the adder circuits are respectively expressed by the foregoing equations (19) and (20). Thus, assuming the gain of the differential amplifier circuit 39 is K, the output voltages (E$^+$, E$^-$) are respectively expressed by:

$$\begin{aligned} E^+ &= K(D^+ - D^-) = K(B^+ - B^- - Cb2^+ + Cb2^-) \\ &= 2K(V2(t) - v2(t2)) \\ (\text{or } & 2K(V2(t) - V2 - v2(t2))) \end{aligned} \tag{39}$$

$$\begin{aligned} E^- &= -K(D^+ - D^-) = K(B^+ - B^- - Cb2^+ + Cb2^-) \\ &= -2K(V2(t) - v2(t2)) \\ (\text{or } & -2K(V2(t) - V2 - v2(t2))) \end{aligned} \tag{40}$$

These do not contain v2(t), therefore during the reception of the small level burst signal B2, the offset component varying transitionally according to elapsed time is completely canceled and only offset component of a given constant level is left. Accordingly, by inputting the output voltages (E$^+$, E$^-$) of the differential amplifier to the discrimination level control circuit or the like disclosed in Japanese Unexamined Patent Publication No. Heisei 8-84160, the offset component of the given constant level is also canceled. Thus, an output waveform with no fluctuation of the duty ratio can be obtained.

As set forth above, in the fifth and sixth embodiments, the function for resetting the peak value or the bottom value held by the peak value holding circuits 31, 32 or the bottom value holding circuits 33, 34 by the external signal is added to the foregoing first, second and third embodiment. By this, even upon reception of the burst optical signal having significantly large level difference, offset transitionally varying according to elapsed time can be canceled.

Respective circuit blocks forming the fifth and sixth embodiments of the offset control circuits are unnecessary to perform adjustment with the external element similarly to the second and third embodiments. Therefore, the shown embodiments are suited for integration into one chip and thus contributes for providing compact and low cost optical receiver.

Next, embodiments omitting a part of the peak value holding circuit, the bottom value holding circuit, the doubling circuit and the adder circuit from the fourth, fifth and sixth embodiments will be discussed as the seventh, eighth and ninth embodiments of the present invention. In the shown embodiments, among offset transitionally varying according to elapsed time, monotonously increasing offset in one burst may reside without being canceled but monotonously decreasing offset can be canceled completely. In general, monotonous increase of the offset occurs during reception of the large level burst signal. In this case, when a ratio of time variation of the offset level relative to signal amplitude is small, influence to fluctuation of the duty ratio of the output waveform is difficult to appear. Accordingly, the seventh, eighth and ninth embodiments are effective for the optical receiver having wide reception dynamic range and having relatively small offset in the absolute value of transitional variation, when ratio of variation of the offset level according to elapsed time is ignorably small with respect to the signal amplitude of the large level burst.

Figure 13:
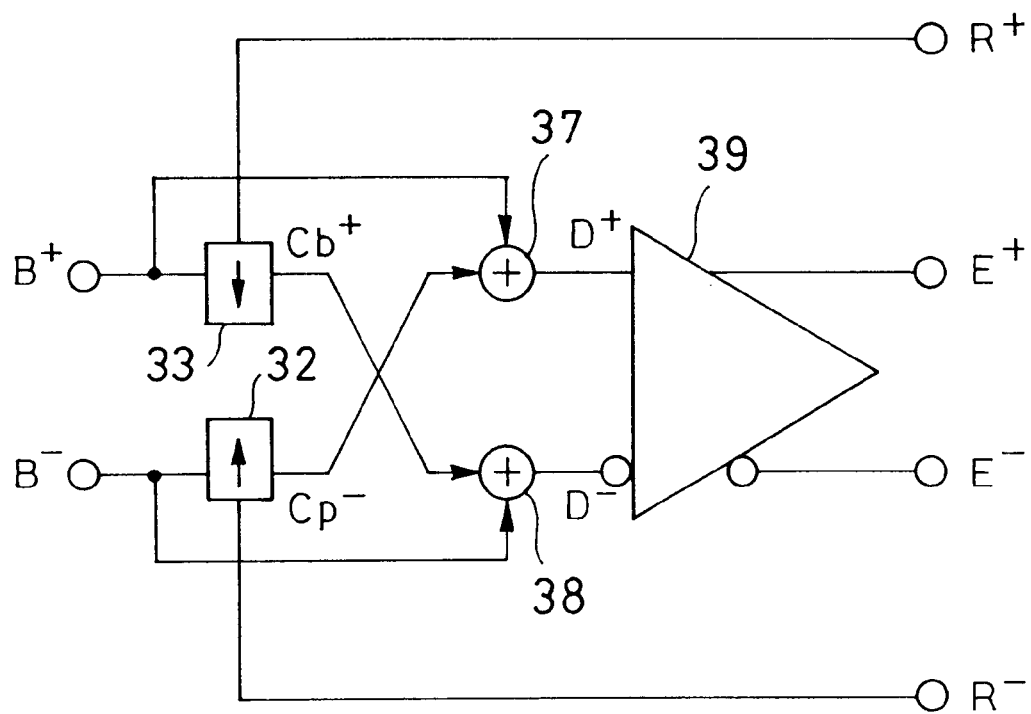
FIG. 13 is a block diagram showing the seventh embodiment of an offset control circuit according to the present invention.

Hereinafter, discussion will be given for the seventh embodiment of the offset control circuit according to the present invention. FIG. 13 is a block diagram showing the seventh embodiment of the offset control circuit according to the present invention. In FIG. 13, the same or equivalent portions with the fourth embodiment of the offset control circuit as illustrated in FIG. 7 will be identified by the same reference numerals, and the disclosure for those common components will be omitted in the following disclosure in order to avoid redundant disclosure and whereby to keep the disclosure simple enough to facilitate clear understanding of the present invention. What is different from FIG. 7 is that the peak value holding circuit 31 on the positive-phase side and the bottom value holding circuit 34 on the negative-phase side are omitted.

Figure 14:
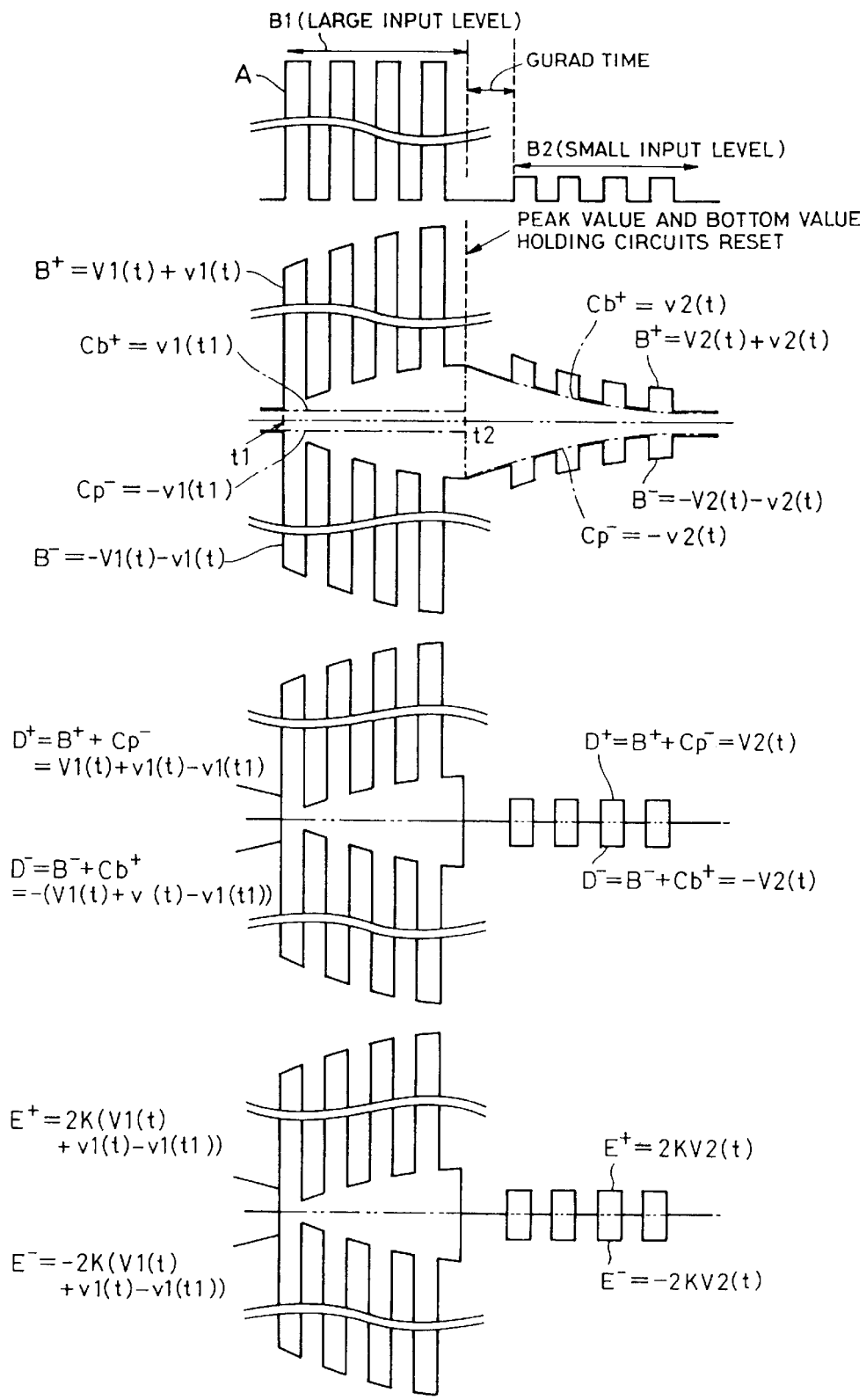
FIG. 14 is a waveform chart at respective portions of the seventh embodiment of the offset control circuit according to the present invention.

Next, operation of the seventh embodiment of the offset control circuit will be discussed with reference to the waveform charts of respective portions shown in FIG. 14. FIG. 14 is the waveform chart upon reception of the small level burst signal B2 after receiving the large level burst signal B1 in the offset control circuit shown in FIG. 13. In the following disclosure, discussion will be given separately for reception of the large level burst signal B1, namely when t1<t<t2 and for reception of the small level burst signal B2, namely when t>t2.

When t1<t<t2, the positive-phase and the negative-phase output voltages (B$^+$, B$^-$) of the pre-amplifier are respectively expressed by the equations (1) and (2). On the other hand, the output voltage Cb$^+$ of the bottom value holding circuit and the output voltage Cp$^-$ of the peak value holding circuit are respectively expressed by the foregoing equations (4) and (5). At this time, the output voltage (D$^+$, D$^-$) of the adder circuit are respectively expressed by:

$$D^+ = B^+ + Cp^-\quad(41)$$
$$= V1(t) + v1(t) - v1(t)$$

$$D^- = B^- + Cb^+\quad(42)$$
$$= -(V1(t) + v1(t) - v1(t))$$

Assuming the gain of the differential amplifier 39 is K, the output voltages (E$^+$, E$^-$) will be respectively expressed by:

$$E^+ = K(D^+ - D^-)\quad(43)$$
$$= 2K(V1(t) + v1(t) - v1(t1))$$

$$E^- = -K(D^+ - D^-)\quad(44)$$
$$= -2K(V1(t) + v1(t) - v1(t1))$$

In these equations, v1(t) is included, however, while the large level burst signal B1 is received, namely, when v1(t) is sufficiently smaller than the amplitude V1 of V1(t) (V1>>v1(t)), the offset component transitionally varying according to elapsed time can be ignored. Therefore, it can be regarded that a given constant level of offset component is remained.

When t>t2, the positive-phase and the negative-phase output voltages (B$^+$, B$^-$) of the pre-amplifier are respectively expressed by the foregoing equations (23) and (24). On the other hand, the output voltage Cb$^+$ of the bottom value holding circuit and the output voltage Cp$^-$ of the peak value holding circuit are respectively expressed by the foregoing equations (26) and (27). Then, the output voltages (D$^+$, D$^-$) of the adder are respectively expressed by:

$$D^+ = B^+ + Cp^- = V2(t)\quad(45)$$

$$D^- = B^- + Cb^+ = -V2(t)\quad(46)$$

Assuming the gain of the differential amplifier being K, the output voltages (E$^+$, E$^-$) are respectively expressed by:

$$E^+ = K(D^+ - D^-) = 2KV2(t)\quad(47)$$

$$E^- = -K(D^+ - D^-) = -2KV2(t)\quad(48)$$

These do not contain v2(t), the offset component varying transitionally according to elapsed time is completely canceled.

Accordingly, by inputting the output voltages (D$^+$, D$^-$) of the adder circuit and the output voltages (E$^+$, E$^-$) of the differential amplifier to the discrimination level control circuit or the like disclosed in Japanese Unexamined Patent Publication No. Heisei 8-84160, the offset component of the given constant level is also canceled. Thus, an output waveform with no fluctuation of the duty ratio can be obtained. As set forth above, the shown embodiment has a construction, in which the peak value holding circuit 31 on the positive-phase side and the bottom value holding circuit 34 on the negative-phase side are omitted from the construction of the fourth embodiment. This is effective in the case where the ratio of variation of the offset level according to elapsed time relative to the signal amplitude of the large level burst is ignorable.

Respective circuit blocks forming the shown embodiment of the offset control circuit is unnecessary to perform adjustment with the external element. Therefore, the shown embodiment is suited for integration into one chip and thus contributes for providing compact and low cost optical receiver.

Figure 15:
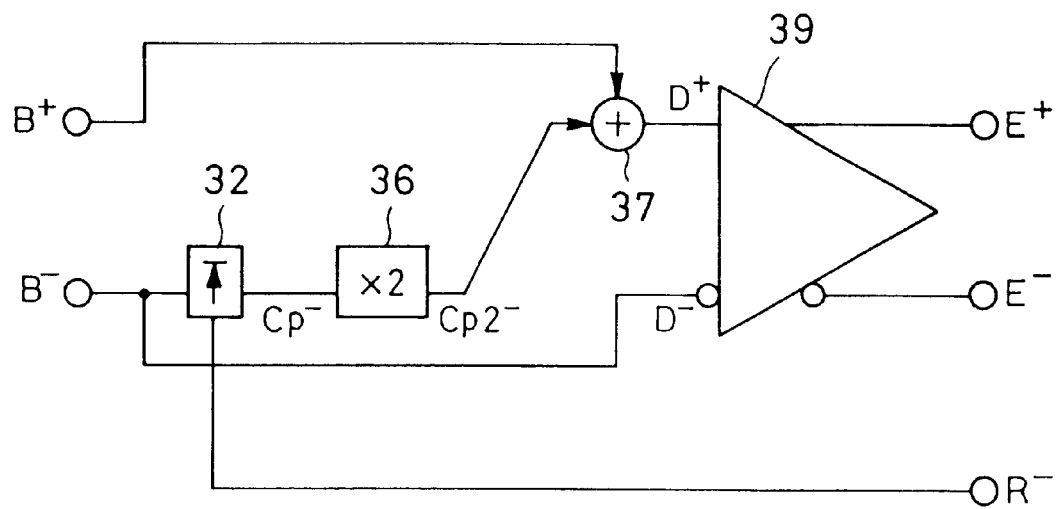
FIG. 15 is a block diagram showing the eighth embodiment of an offset control circuit according to the present invention.

Hereinafter, discussion will be given for the eighth embodiment of the offset control circuit according to the present invention. FIG. 15 is a block diagram showing the eighth embodiment of the offset control circuit according to the present invention. In FIG. 15, the same or equivalent portions with the fifth embodiment of the offset control circuit as illustrated in FIG. 9 will be identified by the same reference numerals, and the disclosure for those common components will be omitted in the following disclosure in order to avoid redundant disclosure and whereby to keep the disclosure simple enough to facilitate clear understanding of the present invention. What is different from FIG. 9 is that the peak value holding circuit 31 on the positive-phase side, the doubling circuit 35 and the adder circuit 38 for the negative-phase side are omitted.

Figure 16:
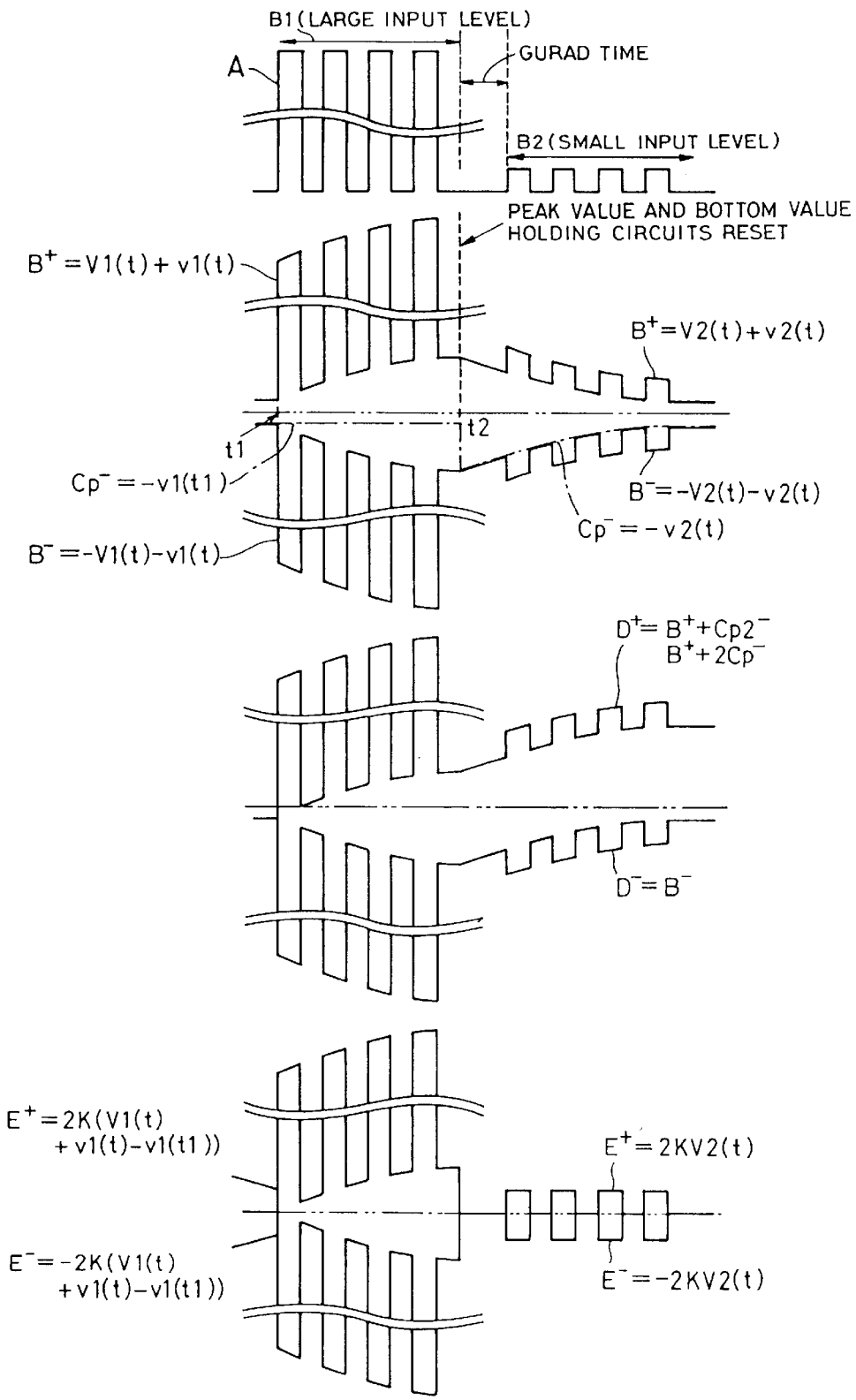
FIG. 16 is a waveform chart at respective portions of the eighth embodiment of the offset control circuit according to the present invention.

Next, operation of the eighth embodiment of the offset control circuit will be discussed with reference to the waveform charts of respective portions shown in FIG. 16. FIG. 16 is the waveform chart upon reception of the small level burst signal B2 after receiving the large level burst signal B1 in the offset control circuit shown in FIG. 15. In the following disclosure, discussion will be given separately for reception of the large level burst signal B1, namely when t1<t<t2 and for reception of the small level burst signal B2, namely when t>t2.

When t1<t<t2, the positive-phase and the negative-phase output voltages ($B^+$, $B^-$) of the pre-amplifier are respectively expressed by the equations (1) and (2). On the other hand, the output voltage $Cp2^-$ of the doubling circuit is expressed by the foregoing equation (12). Accordingly, the output voltage of the adder circuit, namely the positive-phase input voltage $D^+$ of the differential amplifier circuit is expressed by the foregoing expression (13). On the other hand, the negative-phase input voltage $D^-$ of the differential amplifier circuit is expressed by:

$$D^- = B^- \quad (49)$$

Accordingly, assuming the gain of the differential amplifier 39 is K, the output voltages ($E^+$, $E^-$) will be respectively expressed by:

$$E^+ = K(D^+ - D^-) = K(B^+ - B^- + Cp2^-) \quad (50)$$
$$= 2K(Vl(t) + vl(t) - vl(tl))$$

$$E^- = -K(D^+ - D^-) = -K(B^+ - B^- + Cp2^-) \quad (51)$$
$$= -2K(Vl(t) + vl(t) - vl(tl))$$

While v1(t) is included, while the large level burst signal B1 is received, namely, when v1(t) is sufficiently smaller than the amplitude V1 of V1(t) (V1>>v1(t)), the offset component transitionally varying according to elapsed time can be ignored. Therefore, it can be regarded that a given constant level of offset component is remained.

When t>t2, the positive-phase and the negative-phase output voltages ($B^+$, $B^-$) of the pre-amplifier are respectively expressed by the foregoing equations (23) and (24). On the other hand, the output voltage $Cp2^-$ of the doubling circuit is expressed by the foregoing equation (34).

Then, the output voltages ($D^+$, $D^-$) of the adder are respectively expressed by the foregoing equations (13) and (49). Therefore, assuming the gain of the differential amplifier being K, the output voltages ($E^+$, $E^-$) are respectively expressed by:

$$E^+ = K(D^+ - D^-) = K(B^+ - B^- + Cb2^-) \quad (52)$$
$$= 2KV2(t)$$

$$E^- = -K(D^+ - D^-) = -K(B^+ - B^- + Cp2^-) \quad (53)$$
$$= -2KV2(t)$$

These do not contain v2(t), the offset component varying transitionally according to elapsed time is completely canceled. Accordingly, by inputting the output voltages ($E^+$, $E^-$) of the differential amplifier to the discrimination level control circuit or the like disclosed in Japanese Unexamined Patent Publication No. Heisei 8-84160, the offset component of the given constant level is also canceled. Thus, an output waveform with no fluctuation of the duty ratio can be obtained.

Figure 17:
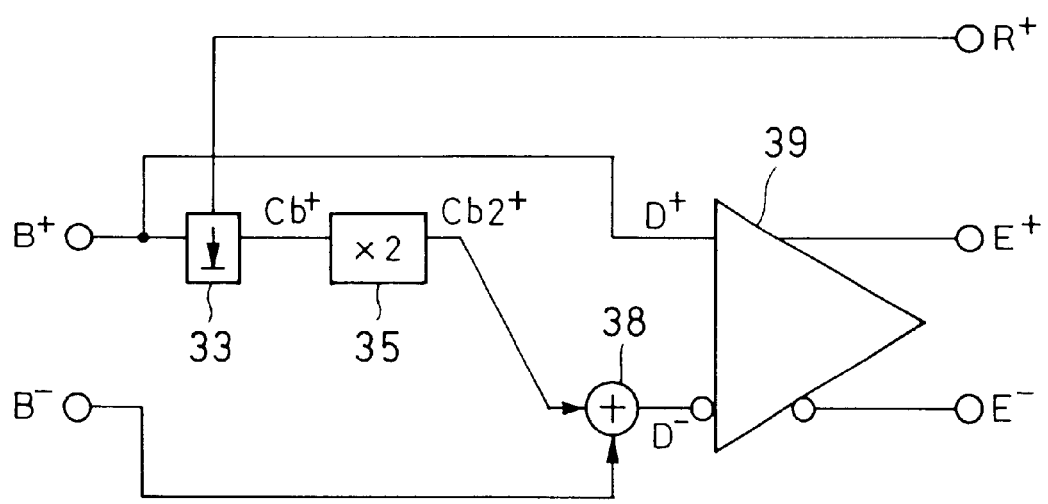
FIG. 17 is a block diagram showing the ninth embodiment of an offset control circuit according to the present invention.
Figure 20:
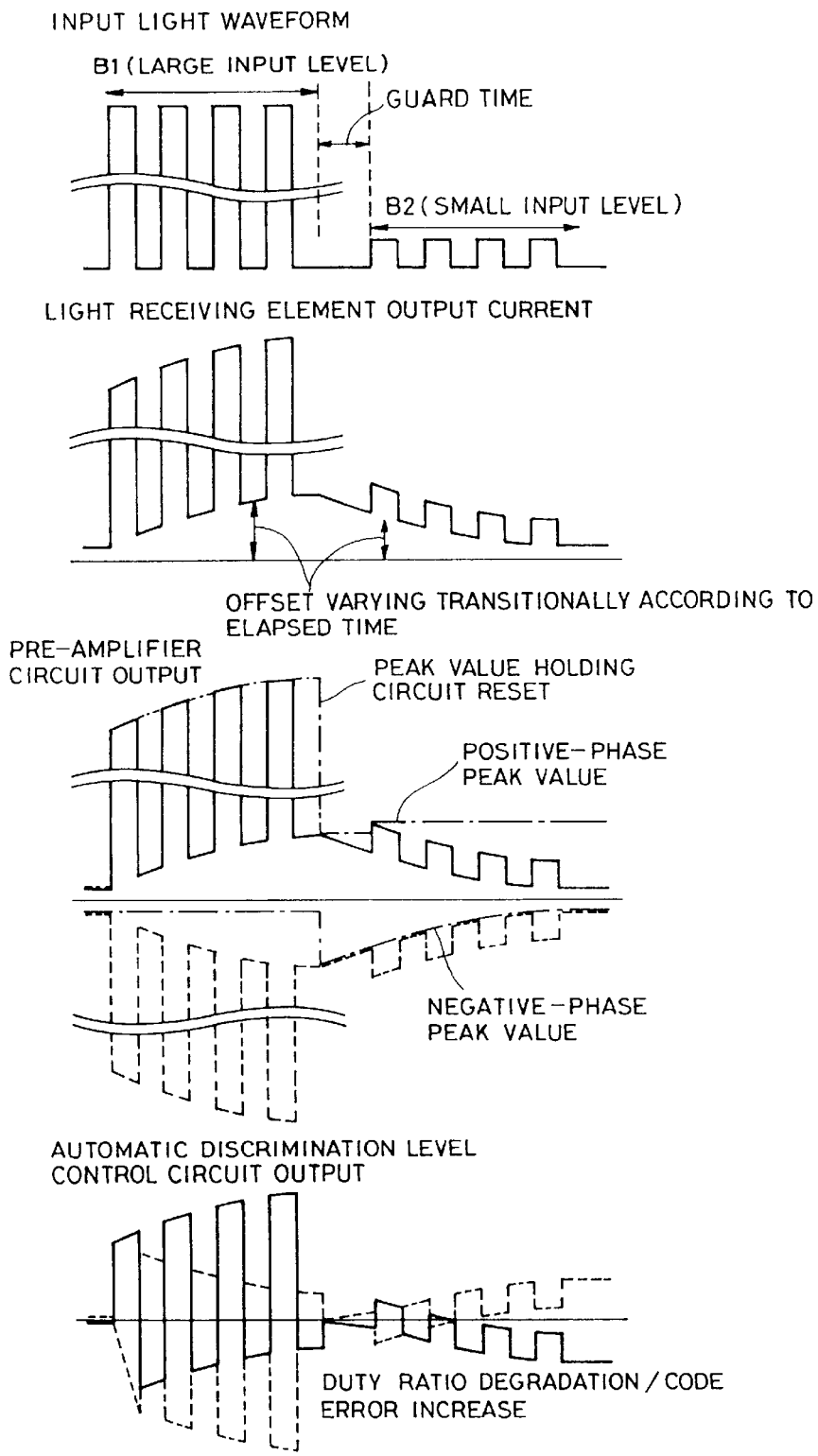
FIG. 20 is a waveform chart at respective portions when burst signals at different levels are input to the light receiving circuit having a function for controlling a given level of offset.
Figure 21:
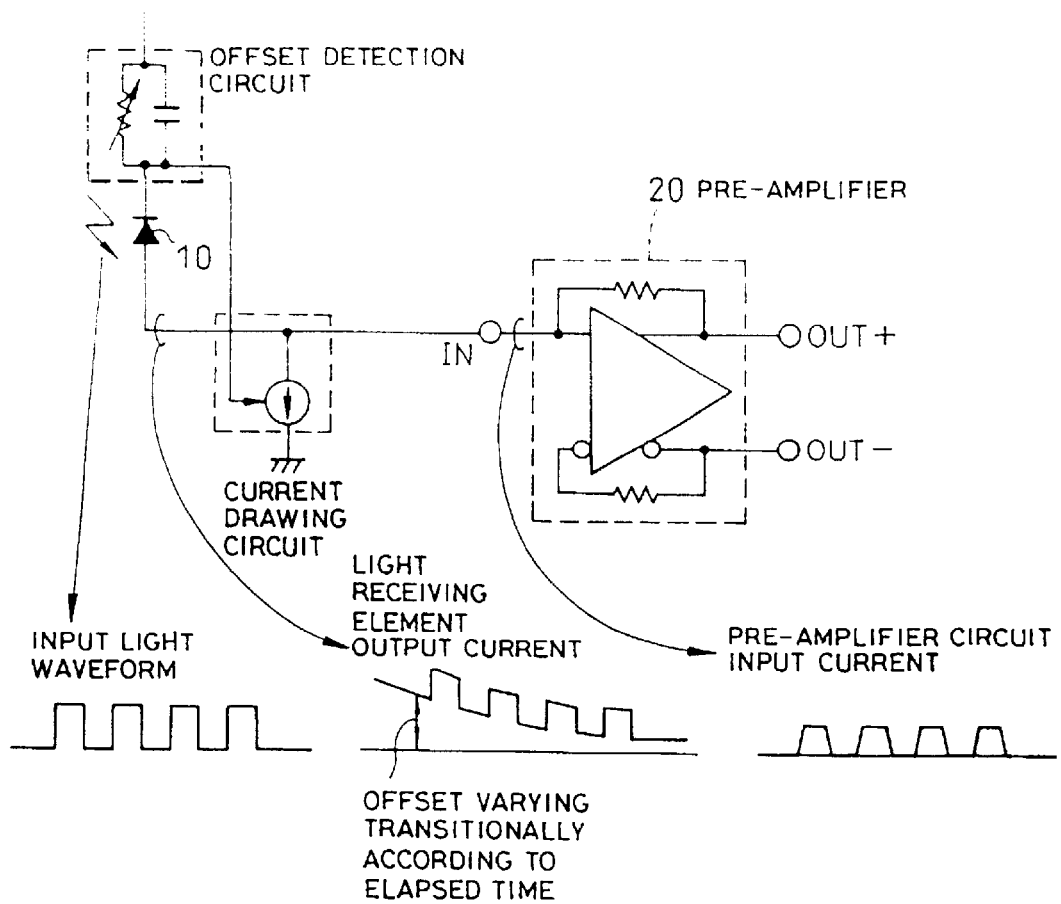
FIG. 21 is a block diagram and waveform charts showing the conventional light receiving circuit having a function for controlling transitionally varying offset according to an elapsed time.

Hereinafter, discussion will be given for the ninth embodiment of the offset control circuit according to the present invention. FIG. 17 is a block diagram showing the ninth embodiment of the offset control circuit according to the present invention. In FIG. 17, the same or equivalent portions with the sixth embodiment of the offset control circuit as illustrated in FIG. 11 will be identified by the same reference numerals, and the disclosure for those common components will be omitted in the following disclosure in order to avoid redundant disclosure and whereby to keep the disclosure simple enough to facilitate clear understanding of the present invention. What is different from FIG. 11 is that the bottom value holding circuit 34 on the negative-phase side, the doubling circuit 36 and the adder circuit 37 for the positive-phase side are omitted.

Next, operation of the ninth embodiment of the offset control circuit will be discussed with reference to the waveform charts of respective portions shown in FIG. 18. FIG. 18 is the waveform chart upon reception of the small level burst signal B2 after receiving the large level burst signal B1 in the offset control circuit shown in FIG. 17. In the following disclosure, discussion will be given separately for reception of the large level burst signal B1, namely when t1<t<t2 and for reception of the small level burst signal B2, namely when t>t2.

When t1<t<t2, the positive-phase and the negative-phase output voltages ($B^+$, $B^-$) of the pre-amplifier are respectively expressed by the equations (1) and (2). On the other hand, the output voltage $Cb2^+$ of the doubling circuit is expressed by the foregoing equation (17). Accordingly, the output voltage of the adder circuit, namely the negative-phase input voltage $D^-$ of the differential amplifier circuit is expressed by the foregoing expression (20). On the other hand, the positive-phase input voltage $D^+$ of the differential amplifier circuit is expressed by:

$$D^+ = B^+ \quad (54)$$

Accordingly, assuming the gain of the differential amplifier 39 is K, the output voltages ($E^+$, $E^-$) will be respectively expressed by:

$$E^+ = K(D^+ - D^-) = K(B^+ - B^- - Cb2^+) \quad (55)$$
$$= 2K(Vl(t) + vl(t) - vl(tl))$$

$$E^- = -K(D^+ - D^-) = -K(B^+ - B^- - Cb2^+) \quad (56)$$
$$= -2K(Vl(t) + vl(t) - vl(tl))$$

In these equations v1(t) is included, however, while the large level burst signal B1 is received, namely, when v1(t) is sufficiently smaller than the amplitude V1 of V1(t) (V1>>v1(t)), the offset component transitionally varying according to elapsed time can be ignored. Therefore, it can be regarded that a given constant level of offset component is remained.

When t>t2, the positive-phase and the negative-phase output voltages ($B^+$, $B^-$) of the pre-amplifier are respectively expressed by the foregoing equations (23) and (24). On the other hand, the output voltage $Cb2^+$ of the doubling circuit is expressed by the foregoing equation (37). Then, the output voltages ($D^+$, $D^-$) of the adder are respectively expressed by the foregoing equations (54) and (20). Therefore, assuming the gain of the differential amplifier being K, the output voltages ($E^+$, $E^-$) are respectively expressed by:

$$E^+ = K(D^+ - D^-) = K(B^+ - B^- - Cb2^+) \quad (57)$$
$$= 2KV2(t)$$

$$E^- = -K(D^+ - D^-) = -K(B^+ - B^- - Cb2^+) \quad (58)$$
$$= -2KV2(t)$$

These do not contain v2(t), the offset component varying transitionally according to elapsed time is completely canceled. Accordingly, by inputting the output voltages (E$^+$, E$^-$) of the differential amplifier to the discrimination level control circuit or the like disclosed in Japanese Unexamined Patent Publication No. Heisei 8-84160, the offset component of the given constant level is also canceled. Thus, an output waveform with no fluctuation of the duty ratio can be obtained.

As set forth above, in the eighth and ninth embodiment, the peak value holding circuit on the positive-phase side, the bottom value holding circuit for the negative-phase side, the doubling circuit and the adder circuit are omitted from the construction of the fifth and sixth embodiments. This is effective in the case where the ratio of variation of the offset level according to elapsed time relative to the signal amplitude of the large level burst is ignorable. Respective circuit blocks forming the eighth and ninth embodiment of the offset control circuit is unnecessary to perform adjustment with the external element. Therefore, the shown embodiment is suited for integration into one chip and thus contributes for providing compact and low cost optical receiver.

Figure 22:
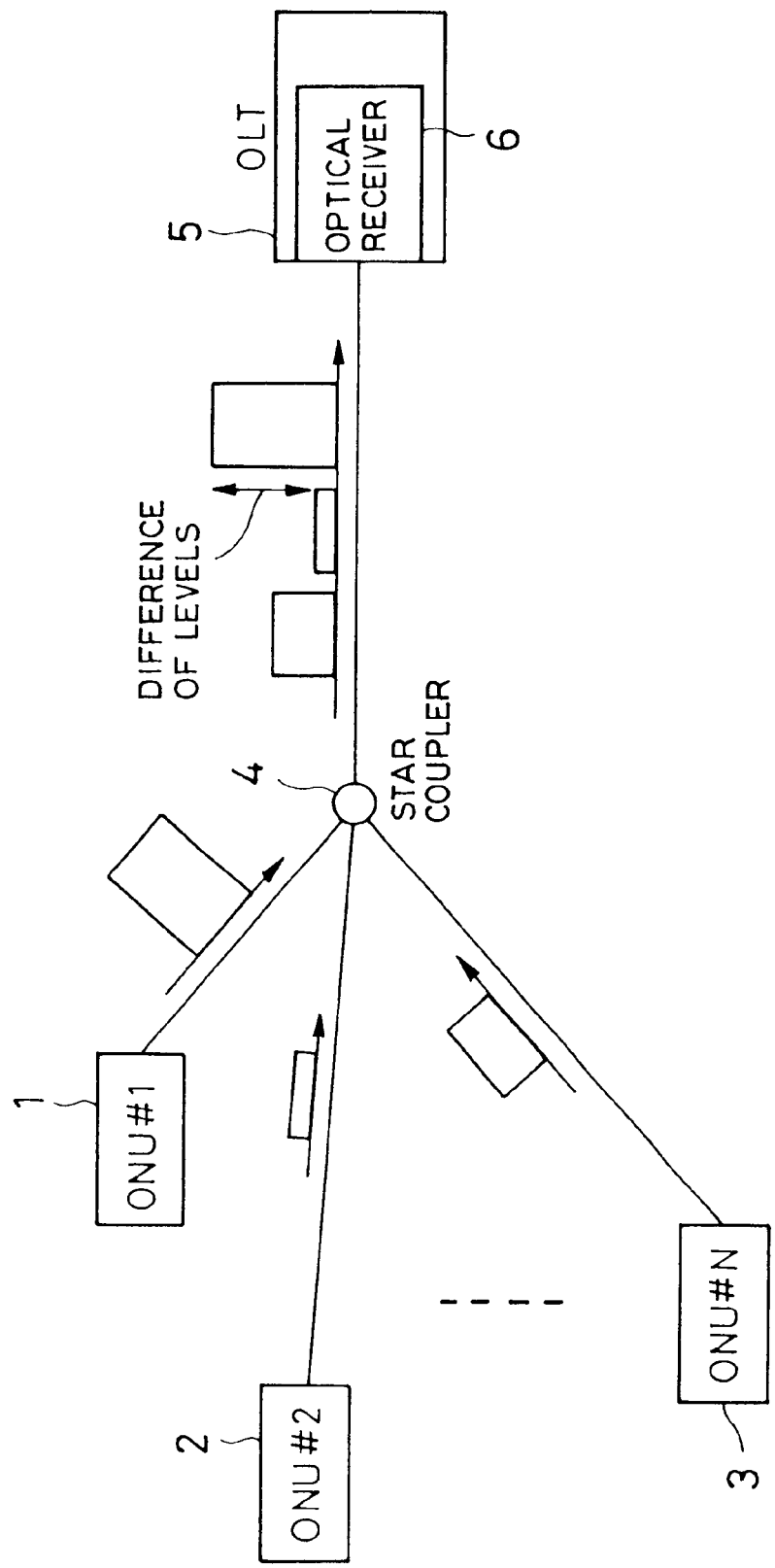
FIG. 22 is a schematic diagram of a PON system to which the present invention is applied.

As set forth, by employing the optical receiver using the offset control circuit according to the present invention, it becomes possible to eliminate offset component which varies transitionally according to elapsed time even when burst form optical signals having significantly different levels transmitted from a plurality of broadcasting stations (ONU) 1 to 3 with the optical receiver 6 of the receiving station (OLT) 5, as shown in FIG. 22. Therefore, accurate output signal without causing fluctuation of the duty ratio can be obtained.

With the present invention, not only in case of reception of the optical signal having a constant level but also in case of reception of the burst form optical signal having significantly level difference, the offset varying transitionally according to elapsed time can be eliminated or canceled to attain output waveform free of fluctuation of the duty ratio without individual adjustment of the optical receiver by the external element. Thus, the present invention is well suited for integration into one chip.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. An offset control circuit comprising offset canceling means for canceling an offset component included in a pair of positive-phase and negative-phase signals and varying transitionally according to elapse of time by using a peak value of at least one of said positive-phase and negative-phase signals and a bottom value of at least one of said positive-phase and negative-phase signals and an adder circuit adding one of said positive-phase and negative-phase signals, to the peak value, and the bottom value of said positive-phase or negative phase signals at substantially the same ratio.

2. An offset control circuit as set forth in claim 1, wherein said offset canceling means includes a peak value holding circuit holding a peak value of said positive-phase signal, a bottom value holding circuit holding a bottom value of said positive-phase signal and arithmetic means for performing operation by connecting outputs of said peak value and bottom value holding circuits with said negative-phase signal in a feedforward connection.

3. An offset control circuit as set forth in claim 2, wherein said adder circuit adds said negative-phase signal and the output signals of said peak value holding circuit and said bottom value holding circuit.

4. An offset control circuit as set forth in claim 1, wherein said offset canceling means includes a peak value holding circuit holding a peak value of said negative-phase signal, a bottom value holding circuit holding a bottom value of said negative-phase signal and arithmetic means for performing operation by connecting outputs of said peak value and bottom value holding circuits with said positive-phase signal in a feedforward connection.

5. An offset control circuit as set forth in claim 4, wherein said adder circuit adds said positive-phase signal and the output signals of said peak value holding circuit and said bottom value holding circuit.

6. An offset control circuit as set forth in claim 1, wherein said offset canceling means includes a first peak value holding circuit holding a peak value of said positive-phase signal, a second peak value holding circuit for holding a peak value of said negative-phase signal, a first bottom value holding circuit holding a bottom value of said positive-phase signal, a second bottom value holding circuit holding a bottom value of said negative-phase signal and arithmetic means for performing operation by connecting outputs of said first peak and first bottom holding circuits with said positive-phase signal and said second peak and second bottom holding circuits with said negative-phase signal in a feedforward connection.

7. An offset control circuit as set forth in claim 6, wherein said arithmetic means includes a first adder circuit adding said positive-phase signal, an output signal of said second peak value holding circuit and an output signal of said second bottom value holding circuit at substantially the same ratio, and a second adder circuit adding said negative-phase signal, an output signal of said first peak value holding circuit and an output signal of said first bottom value holding circuit at substantially the same ratio.

8. An offset control circuit comprising offset canceling means for canceling an offset component included in a pair of positive-phase and negative-phase signals and varying transitionally according to elapse of time wherein said offset canceling means comprises a single value holding circuit comprising one of a peak value and a bottom value of said positive-phase and negative-phase signals, and an arithmetic means for performing an arithmetic operation by connecting outputs of said value holding circuit with one of said positive-phase and negative-phase signals in a feedforward connection by adding one of said positive-phase and negative-phase signals to the output of the single value holding circuit at a ratio of substantially 1:2.

9. An offset control circuit as set forth in claim 8, wherein said offset canceling means includes a bottom value holding circuit holding a bottom value of said positive-phase signal and said arithmetic means for performing operation connects outputs of said hold circuit with said negative-phase signal in feedforward connection.

10. An offset control circuit as set forth in claim 8, wherein said offset canceling means includes a peak value holding circuit holding a peak value of said negative-phase signal and said arithmetic means for performing operation connects outputs of said hold circuit with said positive-phase signal in feedforward connection.

11. An offset control circuit as set forth in claim 1, wherein said offset canceling means includes a bottom value holding circuit holding a bottom value of said positive-phase signal, a peak value holding circuit holding a peak value of said negative-phase signal and arithmetic means for performing operation by connecting outputs of said hold circuit with said positive-phase and negative-phase signals in feedforward connection.

12. An offset control circuit as set forth in claim 11, wherein said arithmetic means includes a first adder circuit adding said positive-phase signal and the output signal of said peak value holding circuit at substantially the same ratio and a second adder circuit adding said negative-phase signal and the output signal of said bottom value holding circuit at substantially the same ratio.

13. An offset control circuit as set forth in claim 1, wherein said offset canceling means includes a peak value holding circuit holding a peak value of said negative-phase signal and arithmetic means for performing operation by connecting the output signal of said hold circuit with said positive-phase signal in feedforward connection.

14. An offset control circuit as set forth in claim 10, wherein said arithmetic means includes a differential amplifier circuit taking the output signal of said adder circuit and said negative-phase signal as inputs.

15. An offset control circuit as set forth in claim 9, wherein said arithmetic means includes a differential amplifier circuit taking the output signal of said adder circuit and said positive-phase signal as inputs.

16. An offset control circuit as set forth in either claim 2 or 4, wherein a held value of said peak value holding circuit or said bottom value holding circuit resets in response to an external control signal input.

17. An optical receiver including an offset control circuit defined in claim 1, comprising:

a light receiving element receiving an optical input signal; and a pre-amplifier for amplifying an output of said light receiving element, wherein a pair of output of said pre-amplifier is said positive-phase and negative-phase signal of said offset control circuit.

18. An optical receiver as set forth in claim 17, which further comprises a discrimination level control circuit for automatically setting a discrimination threshold level of the output signal of said offset control circuit.

19. An optical communication system employing an optical receiver defined in claim 17.

20. An optical communication system as set forth in claim 19, which further comprises an optical subscriber line terminal device transmitting burst form optical signals having different levels with each other and an optical subscriber line terminal station device receiving said burst form optical signal, wherein said optical subscriber line terminal station device includes said optical receiver.

21. An offset control circuit as set forth in claim 8, wherein a held value of said single value holding circuit resets in response to an external control signal input.

22. An optical receiver including an offset control circuit defined in claim 8, comprising:

a light receiving element receiving an optical input signal; and a pre-amplifier for amplifying an output of said light receiving element, wherein a pair of output of said pre-amplifier is said positive-phase and negative-phase signal of said offset control circuit.

23. The optical receiver of claim 22, which further comprises a discrimination level control circuit for automatically setting a discrimination threshold level of the output signal of said offset control circuit.

24. An optical communication system employing an optical receiver defined in claim 22.

25. An optical communication system as set forth in claim 24, which further comprises an optical subscriber line terminal device transmitting burst form optical signals having different levels with each other and an optical subscriber line terminal station device receiving said burst form optical signal, where said optical subscriber line terminal station device includes said optical receiver.

26. The optical communication system of claim 25, wherein the held value of the peak single value holding circuit or the bottom single value holding circuit is reset during a guard time presenting between said burst form optical signals.

* * * * *